United States Patent [19]
Vahala et al.

[11] Patent Number: 6,151,428
[45] Date of Patent: Nov. 21, 2000

[54] ALL-OPTICAL WAVELENGTH CODED LOGIC GATES

[75] Inventors: Kerry John Vahala, San Gabriel, Calif.; Roberto Paiella, Milan, Italy; Guido Hunziker, Neyruz, Switzerland

[73] Assignee: California Institute of Technology, Pasadena, Calif.

[21] Appl. No.: 08/965,851

[22] Filed: Nov. 7, 1997

Related U.S. Application Data

[60] Provisional application No. 60/030,246, Nov. 7, 1996.

[51] Int. Cl.$^7$ ...................................................... G02B 6/00
[52] U.S. Cl. ................................ 385/11; 385/14; 385/16; 385/24
[58] Field of Search ................................ 385/11, 14, 16, 385/24, 28, 40, 45, 130, 131, 132; 359/243, 239, 247; 364/712, 713

[56] References Cited

U.S. PATENT DOCUMENTS

| | | | |
|---|---|---|---|
| 4,630,898 | 12/1986 | Jewell | 350/354 |
| 4,632,518 | 12/1986 | Jensen | 350/385 |
| 5,414,789 | 5/1995 | Tamil et al. | 385/32 |

OTHER PUBLICATIONS

Geraghty, et al., Wavelength Conversion up to 18 nm at 10 Gb/s by Four–Wave Mixing in a semiconductor Optical Amplifier, *IEEE Photonics Technology Letters*, 9(4):452, Apr. 1997.

Glesk, et al., All–optical address recognition and self–routing in a 250 Gbit/s packet–switched network, *Electronics Letters*, 30(16):1322, Aug. 4, 1994.

Khurran Kazi, Elimination of Clock Recovery and Framing by Transporting Clock, Data Synchronization Pulse for OC–192 Using WDM, *Journal of Lightwave Technology*, 13(11):2136, Nov. 1995.

Lee, et al., Dascaded Wavelength Conversion by Four–Wave Mixing in a Strained Semiconductor Optical Amplifier at 10 Gb/s, *IEEE Photonics Technology Letters*, 9(6):752, Jun. 1997.

Loab and Stilwell, Jr., High–Speed Data Transmission on an Optical Fiber Using a Byte–Wide WDM System, *Journal of Lightwave Technology*, 6(8):1306, Aug. 1988.

Paiella, et al., Polarization–Dependent Optical Nonlinearities of Multi quantum–Well Laser Amplifiers Studied by Fours–Wave Mixing, *IEEE Journal of Selected Topics in Quantum Electronics*, 3(2):529, Apr. 1997.

(List continued on next page.)

*Primary Examiner*—Phan T. H. Palmer

[57] ABSTRACT

All-optical logic gates in which binary words are encoded using wavelength. A method and apparatus for processing information in this wavelength encoded format is provided. The processing may occur entirely in the optical domain. This approach is modular and enables construction of logic gates using custom wave guide chips that can be mass-produced in a manner similar to that of conventional electronic digital chips. Specific gates, such as AND, OR, EXOR, or NAND, may be "programmed" into a given chip during its fabrication to encode the desired truth table. The output states of the chip are determined by ultrafast mixing of binary encoded wavelengths in a semiconductor optical amplifier. The result is a new wavelength having a relationship to the input wavelengths determined entirely by the desired truth table. The possible clock-rates for these gates can be exceedingly high, such as several hundred Gigabits/second. The product of integer word length "N" and gate clock speed can exceed several Terabits/second and may be as high as the overall optical bandwidth of the system. Complicated multi-input functions may be constructed using this approach and dynamically programmable functions may be built in which either electrical or optical signals reconfigure a set of gates by reprogramming the inverter operations in the chips.

49 Claims, 21 Drawing Sheets

OTHER PUBLICATIONS

Patel, et al., 40–Gbit/s cascadable all–optical logic with an ultrafast nonlinear interferometer, *Optics Letters*, 21(18):1466, Sep. 15, 1996.

Shao and Kao, WDM Coding of High–Capacity Lightwave Systems, *Journal of Lightwave technology*, 12(1):137, Jan. 1994.

Vahala, et al., Four–Wave Mixing in Semiconductor Traveling–Wave Amplifiers for Wavelength Conversion in All–Optical Networks, *International Journal of High Speed Electronics and Systems*, 7(1):153, 1996.

Vahala, et al., Ultrafast WDM Logic, *IEEE Journal of Selected Topics in Quantum Electronics*, 3(2):698, Apr. 1997.

| E | TE Polarizer |
| M | TM Polarizer |
| ⊙ | Half Wave Polarization Rotation |

Mach-Zehnder Wavelength Splitter

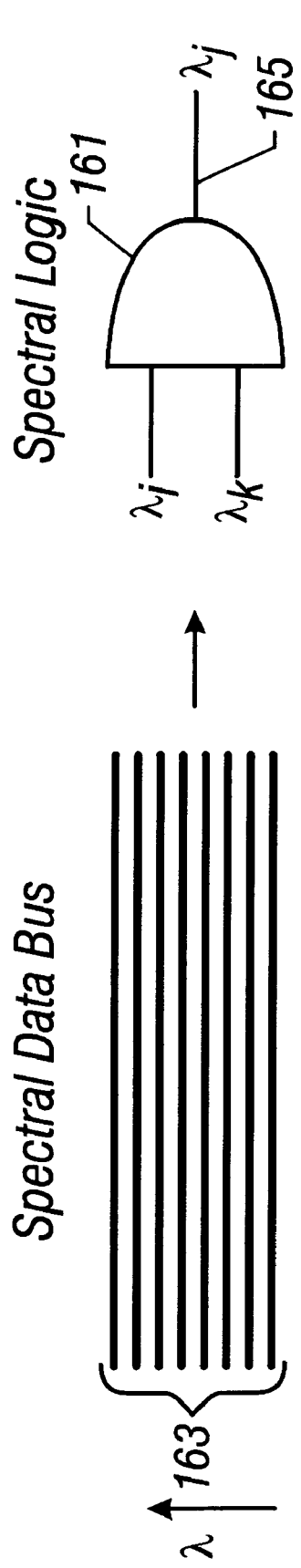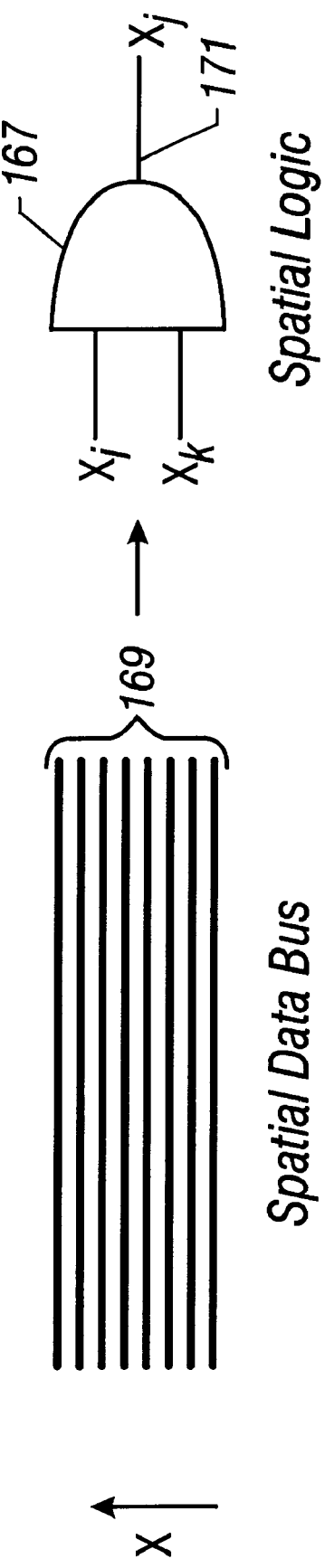

| $\lambda_1$ | $\lambda_2$ | $\lambda_3$ |
|---|---|---|
| x | x | x |
| 1 | x | x |
| x | 1 | x |
| 1 | 1 | 1 |
TABLE I
Legend for Optical Circuit Diagrams
 Wavelength Converter (Conditional Test)
 Half wave element (inverter)
 Unassigned Half wave element
TABLE II
 Polarization Sensitive 1X2 Splitter
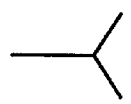 Wavelength Sensitive 1X2 Splitter
─⟨ 1X2 Splitter or Combiner

EXOR Truth Table

$\lambda_1$ $\lambda_2$ $\lambda_3$

| i | j | k |
|---|---|---|
| 0 | 0 | 0 |
| 0 | 1 | 1 |
| 1 | 0 | 1 |
| 1 | 1 | 0 |

TABLE III

$\lambda_1$ $\lambda_2$ $\lambda_3$

| i | j | k |
|---|---|---|
| 0 | 0 | A |
| 0 | 1 | B |
| 1 | 0 | C |
| 1 | 1 | D |

TABLE IV

$\lambda_1$ $\lambda_2$ $\lambda_3$ $\lambda_c$

| i | j | k | m |
|---|---|---|---|
| 0 | 0 | 0 | 0 |
| 0 | 1 | 1 | 0 |
| 1 | 0 | 1 | 0 |
| 1 | 1 | 0 | 1 |

TABLE V

$\lambda_1$ $\lambda_2$ $\lambda_3$ $\lambda_4$

| i | j | k | m |
|---|---|---|---|
| 0 | 0 | 0 | A |
| 1 | 0 | 0 | B |
| 0 | 1 | 0 | C |
| 1 | 1 | 0 | D |
| 0 | 0 | 1 | E |
| 0 | 1 | 1 | F |
| 1 | 0 | 1 | G |
| 1 | 1 | 1 | H |

TABLE VI

ALL-OPTICAL WAVELENGTH CODED LOGIC GATES

CROSS REFERENCE TO RELATED APPLICATIONS

This application is a continuation-in-part of U.S. Provisional Application Ser. No. 60/030,246, filed Nov. 7, 1996.

BACKGROUND AND SUMMARY OF THE INVENTION

Wavelength division multiplexing ("WDM") has been implemented in high capacity trunk line telephony systems using multi-wavelength all-optical functions. It may likely be the standard in all future trunk services and may ultimately play a role in metropolitan and local-area all-fiber networks. To date, the optical functions employed in such services assumed serial, independent WDM data channels.

Conventional WDM encodes independent base-band digital signals at gigabits/sec [Gb/s] rates onto a series of optical carriers or channels that are evenly spaced in frequency. Single channel rates in non-WDM trunk systems currently run at, e.g., 2.5 Gb/s in continental systems and have reached 5 Gb/s in certain undersea systems. Some trial systems have achieved 10 Gb/s. The first WDM systems will operate with channel rates of 2.5 Gb/s, but may ultimately go higher.

In light of current and continued trends in WDM optical transmission, it is interesting to consider the opportunities to enhance bandwidth, coding, etc., created by WDM. As early as 1988, workers at IBM considered the channel capacity enhancement that could result from a wavelength encoded byte. The IBM workers were able to show that group velocity dispersion-induced bit skew across the wavelength encoded byte severely limits the overall bit rate. In particular, individual channel rates need to be greatly decreased to prevent the individual bits within a given byte from skewing into adjacent time slots occupied by bits at other wavelengths in adjacent bytes. This reduces the gains achieved through wavelength encoding.

Other workers subsequently considered the theoretical possibilities of a spectral or wavelength encoded data bus for improving error correction algorithms and improving data framing as well as the elimination of clock recovery.

In these systems, group velocity dispersion is one limit on transmission capacity. However, dispersion management, not known as a technique even in 1988, is now a well established tool to combat group velocity dispersion in fiber optic systems. Many tools, as well as fiber types, have been developed to ameliorate the bit skew problems noted above. Thus, one important limitation to wavelength encoding of bytes has now been eliminated.

The present invention describes a new approach to implement logic elements which process information that has been encoded in wavelength. The processing occurs entirely in the optical domain and uses ultra-fast wave mixing as a conditional test function. As a result, the clock cycle for the gates described can reach exceedingly high values approaching several hundred Gb/s or even more. The approach enables a modular design similar to that of conventional electronic digital chips. Specific gates (e.g., AND, OR, EXOR, NAND) are programmed into waveguide chips to encode the desired truth tables. The conditions generated by such chips are tested by a four-wave mixing process, creating an output wavelength whose polarization is related to the polarization states of the input waves by way of the truth table.

The idea of using wavelength encoded bytes as a means for introducing one clock cycle error correction into an optical link is one application of the invention. Error correction bits are assigned to some of the wavelengths in the overall byte. A simple (15,11) Hamming code, for example, can be used to assign 4 parity bits to a 15 bit wide wavelength encoded byte (i.e., 11 data bits). If signal-to-noise levels are sufficient to produce $10^{-9}$ error rates without coding, then the simple single error correction Hamming code results in an improvement to $10^{-18}$ error rates. Such a wavelength encoded error correction scheme may be very attractive in situations where burst errors are possible and link integrity must remain high at all times.

Another application is spectral logic or digital circuits employing optical gates. Fiber optic spectral buses may extend the useful range of high speed interconnections between computers without resorting to serial-deserial nodes. Spectral logic can perform certain functions in a word-by-word fashion in this and other applications.

Any application of wavelength encoded bytes benefits from byte processing in the optical domain. Many of the incentives for pursuing wavelength encoded bytes rely upon a certain amount of optical processing. Otherwise, electronic logic operations must be used to code, decode and process information at either end of the link, thereby either greatly slowing down the possible optical channel rates or increasing the required cost. The approach of the present invention allows for construction of any logical function operating at nearly arbitrarily high clock rates. The approach also makes possible modular circuit designs that could ultimately be produced in large quantities to carry out relatively complex calculations.

BRIEF DESCRIPTION OF THE DRAWINGS

FIG. 14(A) shows a spectral data bus with a spectral logic gate according to an embodiment of the present invention.

FIG. 14(B) shows a prior art spatial data bus and a prior art spatial logic gate.

Table I shows a truth table for an AND gate.

Table II shows an optical circuit diagram legend for all of the figures.

Table III shows the truth table for an EXOR gate.

Table IV shows a truth table for a two-input logic gate.

Table V shows the truth table for an EXOR gate with a carry output.

Table VI shows the truth table for a generalized three input binary logic gate.

DETAIL DESCRIPTION

Four-wave mixing has been applied in semiconductor optical amplifiers ("SOA"s) as a technique for carrier wave spectral translation. The optical logic gates described here use the wave mixing present in these devices in a new way, as an ultra fast conditional test function. The conditional test function is first applied to construct an arbitrary two-input logic gate, from which arbitrarily complex functions can be created.

Figure 1:
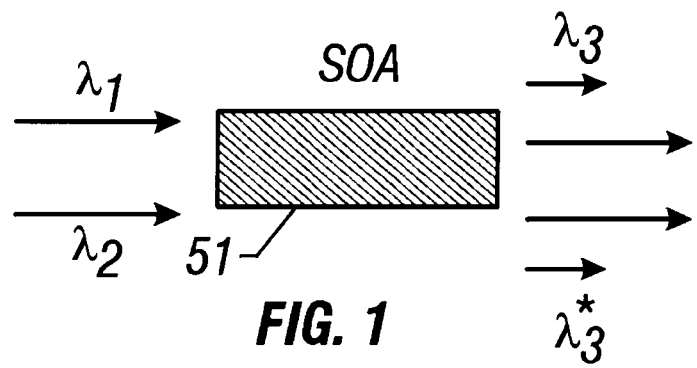
FIG. 1 shows a basic layout for the process of four-wave mixing in a semiconductor optical amplifier.

FIG. 1 illustrates the basic layout for the process of four-wave mixing in semiconductor optical amplifiers. Two waves $\lambda_1$ and $\lambda_2$ are introduced via one or two data lines into SOA 51. These waves carry encoded first and second input data. Waves $\lambda_1$ and $\lambda_2$ induce dynamic gain and index gratings in the active layer of SOA 51. The gratings then scatter energy out of waves $\lambda_1$ and $\lambda_2$ creating $\lambda_3$ and $\lambda_3^*$.

Figure 2A:
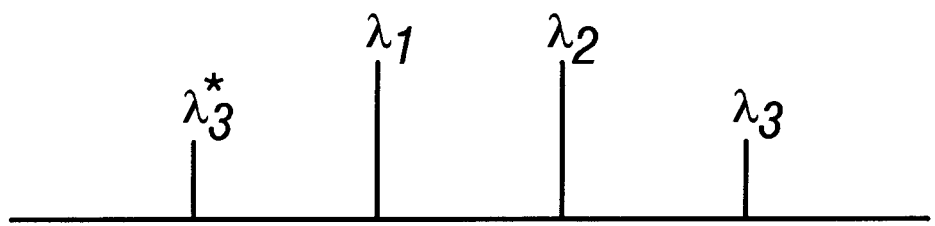
FIGS. 2(A)–(C) show three combinations of input waves and output waves, the output waves dependent on the relative polarizations of the input waves.
Figure 2B:
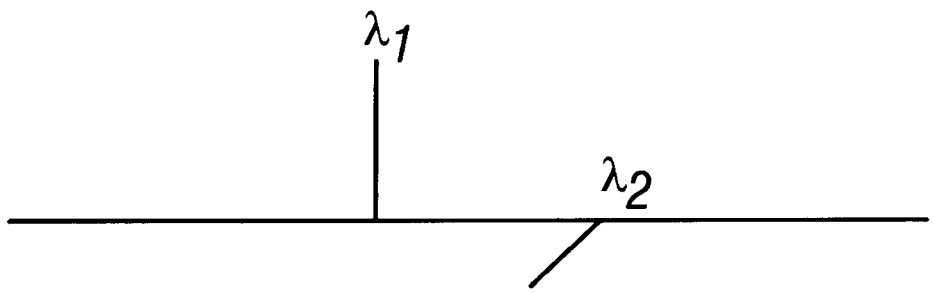
Figure 2C:
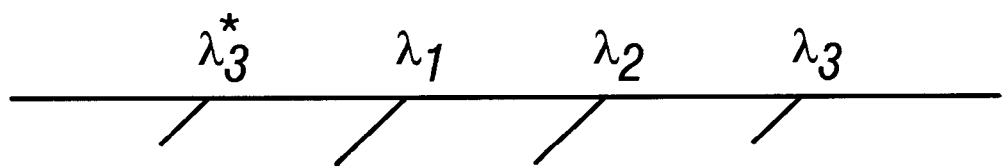

FIGS. 2(A)–(C) show that this process can be polarization-sensitive. Information content can be encoded onto the waves using optical states or characteristics such as polarization. For example, the amplitude and polarization of $\lambda_3$ and $\lambda_3^*$ can be used as a "conditional" test of the two input (or "signal") waves $\lambda_1$ and $\lambda_2$ in time and polarization. Two parallel-polarized waves will provide two $\lambda_3$ and $\lambda_3^*$ as described and shown in FIGS. 2(A) and 2(C). $\lambda_3$ and $\lambda_3^*$ may than be detected by an appropriate polarization-sensitive detector. However, two orthogonally polarized input waves will not mix if the semiconductor gain medium is isotropic (see FIG. 2(B)).

Figure 3:
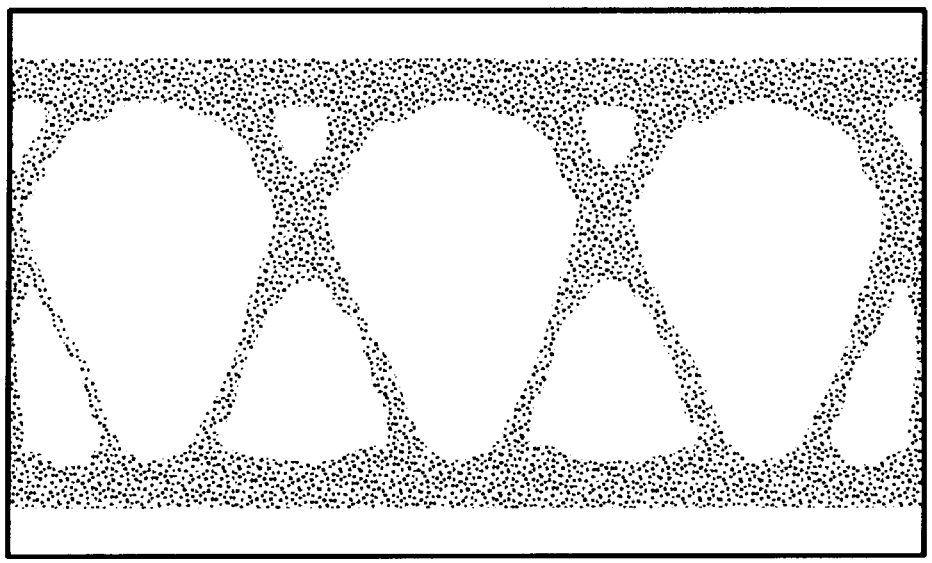
FIG. 3 shows an eye diagram for an externally modulated signal before wavelength conversion.
Figure 4:
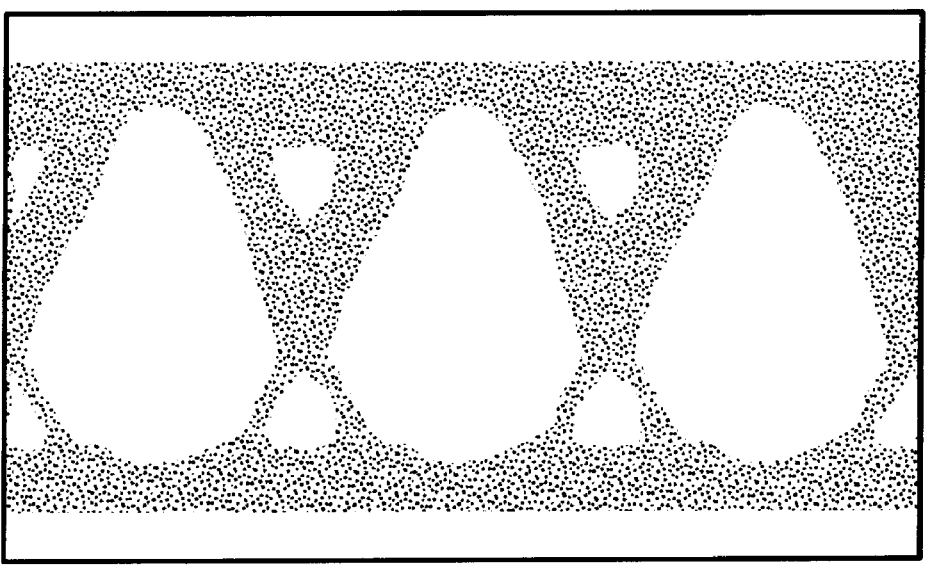
FIG. 4 shows an eye diagram for an externally modulated signal after wavelength conversion.

The mixing processes have been characterized and can generate waves of sufficient strength to shift a 10 Gb/s modulated carrier by over 2 THz with error-free recovery of the data. FIGS. 3(A) and 3(B) are "eye" diagrams showing a 10 Gb/s pseudo-random bit stream measured first at the output of an externally modulated DFB laser (FIG. 3(A)) and second after down-conversion by 18 nm in a high performance SOA converter (FIG. 3(B)). The eye diagram measured after 18 nm of wavelength shift is qualitatively similar to that measured directly after modulation. Error-free data recovery has been demonstrated for all shifts less than 18 nm. One significance of the 18 nm number here is to show that the four-wave mixing process is ultra-fast. High bit-rate cascading of these elements may also be implemented, which is a useful feature for application in logic gates as is described below.

Four-wave mixing provides a simple but crucial function for wavelength-encoded logic by testing for a condition of coincidence of two wavelengths having the same polarization (e.g., the input waves in FIG. 1) and by providing two new signals, either one of which can be used to confirm the coincidence.

Table I shows a truth table for co-linearly polarized input waves. The "1" state represents that power is present in the corresponding wavelength and the "X" state indicates that power is not present in the corresponding wavelength. This conditional test function occurs on femtosecond timescales and is therefore essentially instantaneous for any data rate less than a few hundred Gb/s.

The meaning of logical "1" and logical "0" for each wavelength in the system may be defined to create a logic function using this conditional test function. Power present at a given wavelength may be defined as a "1" state and no power present as a "0" state (i.e., "power-coded" data). Table I is the truth table for an AND gate under this power coding scheme. Such a scheme, however, may not be readily compatible with ultra-fast switching (i.e., femtosecond rates) which is possible using four-wave mixing. One possibility may be to use cross-gain saturation in SOAs as the inversion function on power coded digital data. This inversion function could be combined with the AND function of Table I to create a NAND gate for power coded data. The resulting NAND operation can be used to generate any desired N-input logic function using a general theorem from Boolean algebra. However, the cross-gain saturation mechanism used to create the inversion function is slow on the time scale of the four-wave mixing AND operation and therefore it limits the overall logic speed.

Another alternative, that much less compromises speed, is polarization coding. In this system, each wavelength resides in one of two predetermined linearly polarized states that are designated as logical "1" or logical "0".

Polarization coding, by itself, is not a new idea nor is the idea of combining polarization coding with WDM to enhance channel capacity. For example, in the recent 1 Tb/sec transmission experiment reported by workers at AT&T, both polarization states of a single mode fiber were used in conjunction with 25 WDM wavelengths to yield an equivalent 50 optical channels of data.

As will be shown below, polarization coding offers significant system simplifications when combined with the four-wave mixing conditional test function in addition to maintaining ultra-fast switching performance.

One of these simplifications is that the inversion function can be implemented using optical elements which alter an optical property (e.g., polarization) of the waves, such as half-wave polarization elements. In particular, the half-wave element in conjunction with frequency selective taps and the four-wave mixing conditional test function can be used to construct any truth table. The frequency selective taps and half-wave elements can be implemented in $SiO_2$ chips that can be ordered through a foundry at a modest cost. Thus, optical chip sets can be developed for any desired truth table.

In the description to follow, optical circuit elements are used in various diagrams according to the legend in Table II.

Figure 5A:
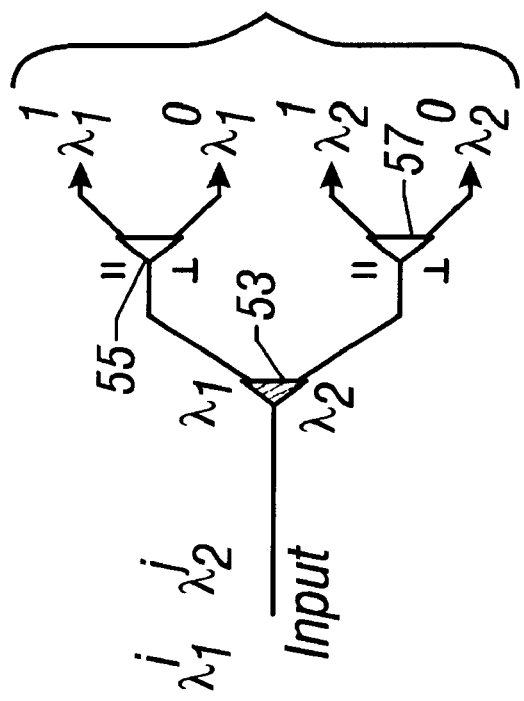
FIG. 5(A) shows a first step in defining a two-input logic gate. Four possible input bits are resolved into separate wave guides according to wavelength and polarization.
Figure 5B:
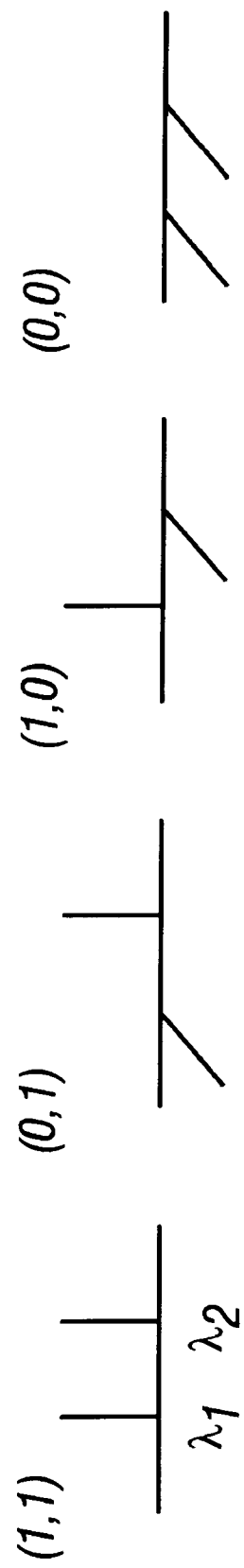
FIG. 5(B) shows the possible input states.

The approach described above has been used to construct an arbitrary two-bit truth table. The first step in the process, as shown by FIG. 5(A), is to resolve the possible input bits $\lambda_1^i$ and $\lambda_2^j$ of the two optical channels according to both wavelength (e.g., channel) and to polarization. FIG. 5 illustrates both the possible bit configurations (FIG. 5(B)) and the simple wave guide network (FIG. 5(A)) that is used to resolve the bits. Such a network may include, for example, a wavelength-sensitive beamsplitter. The nomenclature introduced in this figure assigns a channel subscript to the wavelength and a logical "1" or "0" superscript according to whether the polarization is TE for "1" or TM for "0". The two wavelengths are contributed from two different wavelength encoded words as illustrated in the figure.

In FIG. 5(A), $\lambda_1^i$ and $\lambda_2^j$ are resolved by a 1×2 wavelength sensitive first beamsplitter 53. The wave having the wavelength $\lambda_1$ takes the upper path, and the wave having the wavelength $\lambda_2$ takes the lower path. The wave having the wavelength $\lambda_1$ is then incident on a 1×2 polarization sensitive second beamsplitter 55, while the wave having the wavelength $\lambda_2$ is incident on another 1×2 polarization sensitive second beamsplitter 57. Each 1×2 polarization sensitive second beamsplitter resolves its incident wave into two states: TE (1) or TM (0). Geometric depictions of the possible states (i,j) are shown in FIG. 5(B). In two of the states, the bits are parallel; in the other two, the bits are perpendicular.

Figure 6A:
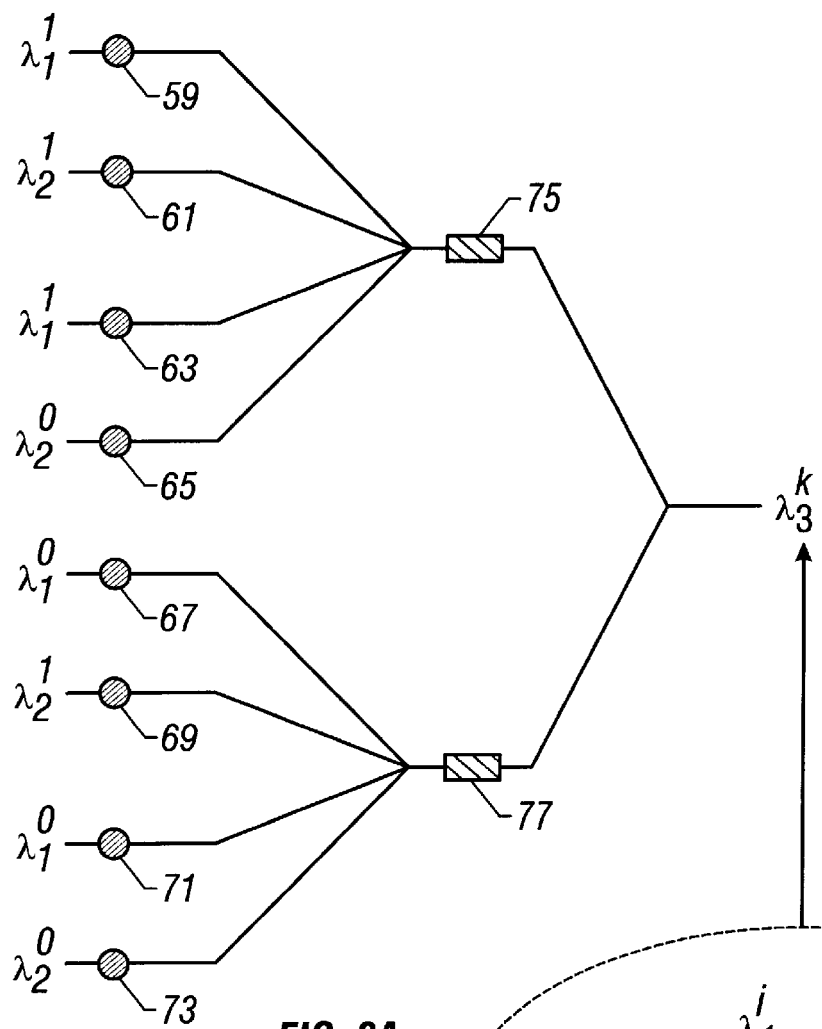
FIGS. 6(A) shows a second step in defining a two-input logic gate where possible pairings of input bits are created in the wave guides.

FIG. 6(A) illustrates the second step in the gate construction process. In this step, the bits are paired up from the first process to form a plurality (here, four) of possible binary combinations. In other words, each $\lambda_1^i$ is paired with each $\lambda_2^j$. For two-bit boolean algebra, four possible combinations may occur. Each of the four possible combinations is then compared pair-wise in an SOA. In FIG. 6(A), $(\lambda_1^1,\lambda_2^1)$ is shown as the top pairing. $(\lambda_1^1,\lambda_2^0)$ is shown as the next pairing down, etc. The truth table is then used to assign half-wave polarization rotation elements (i.e., inverters) to selected lines in the resulting network. There is a unique arrangement of half wave elements for each truth table. The placement of these half-wave elements amounts to programming the truth table into the gate. These half-wave elements are shown as unassigned half-wave elements 59, 61, 63, 65, 67, 69, 71 and 73 in FIG. 6(A).

Figure 6B:
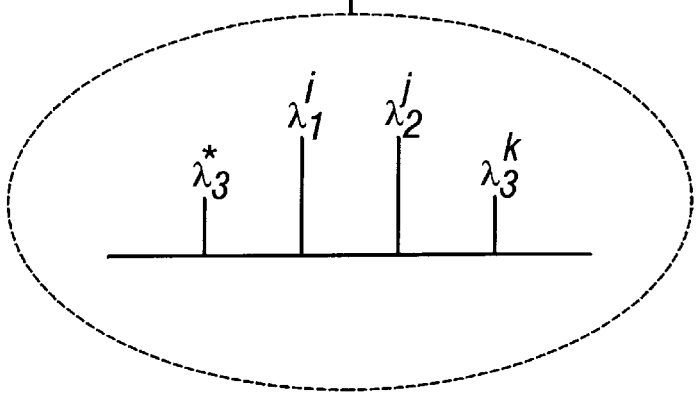
FIG. 6(B) shows the general polarization states of the input bits and the output bits.

The resulting output waves are then input to the two semiconductor optical amplifiers. In FIG. 6(A), $(\lambda_1^1,\lambda_2^1)$ and $(\lambda_1^1,\lambda_2^0)$ are mixed by SOA 75. $(\lambda_1^0,\lambda_2^1)$ and $(\lambda_1^0,\lambda_2^0)$ are mixed by SOA 77. The waves undergo four-wave mixing in the amplifiers and each SOA generates a new output wave as illustrated in FIG. 6(B). The polarization of either of these new waves is logically related to the polarization of the input waves according to the truth table given in Table IV. Four-wave mixing has thus synthesized a single channel logical result from two distinct input channels. The desired gate operation (i.e., truth table) has been implemented at femtosecond speeds in the optical domain. Finally, the two new output waves are combined into a resulting wave $\lambda_3^k$.

A specific example will help to clarify how this process accomplishes the desired task.

Figure 7A:
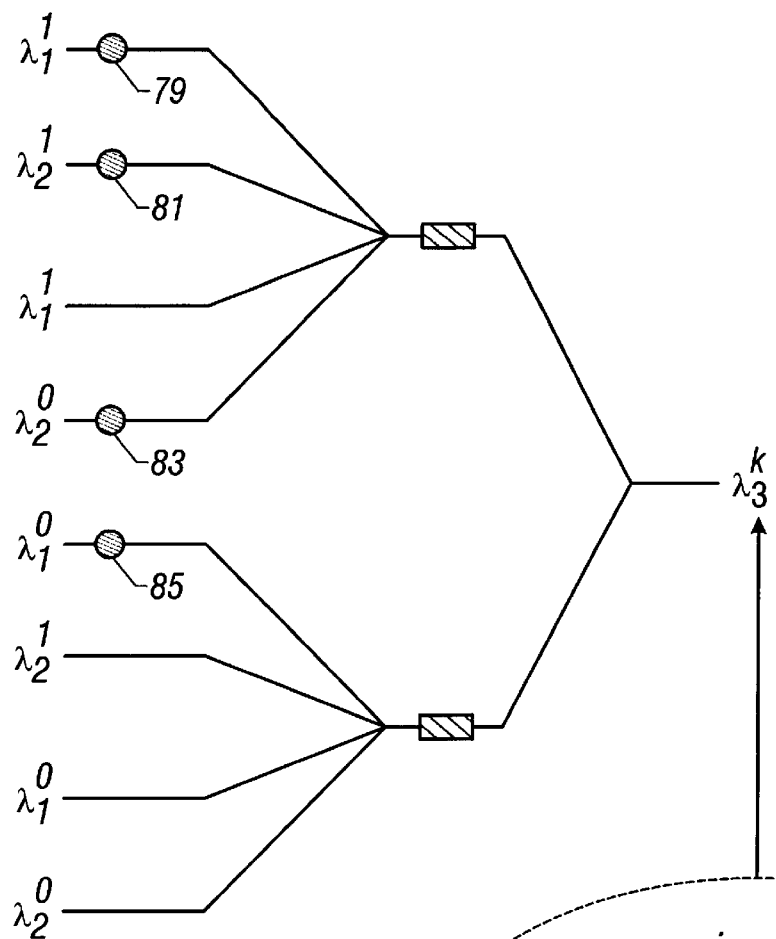
FIG. 7(A) shows the second step in defining a two-input logic gate for the specific case of an EXOR gate.

One logical element that may be constructed is an exclusive OR gate (i.e., "EXOR" gate). The first step in the process proceeds the same for all gates as depicted in FIG. 5. The gate programming procedure occurs in the second step, now outlined for the EXOR gate in FIG. 7(A). The EXOR truth table is given in Table III and must be translated to the language of polarization coding in which TE is logical "1" and TM is logical "0". The top two inputs in the wave guide network of FIG. 7(A) correspond to inputs of "1" on each optical channel (i.e., both are TE polarized). To construct an EXOR gate, the network should be programmed so that when this condition occurs, four-wave mixing in the SOA will produce a new wave that is polarized TM, i.e., a logical "0" as required by the truth table. To accomplish this, a half-wave rotation is introduced on each of the top two input wave guides as indicated in FIG. 7(A) where a solid circle is the symbol for the half-wave rotation. Such a rotation may be caused by two half-wave invertors 79 and 81.

Figure 7B:
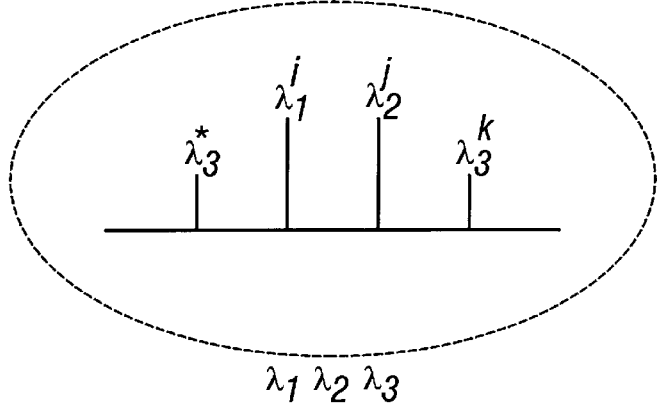
FIGS. 7(B) and 7(C) show the general polarization states of the input bits and the output bits.
Figure 7C:
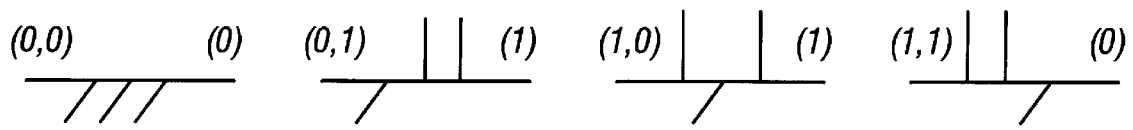

Proceeding to the next two input guides, this pair corresponds to logical "1" (TE) on the first input wavelength and logical "0" (TM) on the second input wavelength. The truth table requires a logical "1" (TE) output when this condition occurs. This requires that a half-wave inverter 83 be introduced on the second wave input as indicated. Thus, four-wave mixing will create a third wave polarized TE or logical "1" when the [1,0] input (equivalently [TE,TM]) occurs. Proceeding down the remaining inputs, the truth table locations are filled-in as indicated in FIG. 7(A). FIGS. 7(B) and 7(C) show the corresponding input and output polarization states.

It is interesting to note that two SOAs (rather than one SOA) are used to perform the conditional test functions. Two SOAs are used to separate the input cases into two subgroups as illustrated in the figures, since otherwise unintentional pairing of states may result in the mixing process, creating spurious logical outcomes. The waves undergo four-wave mixing in the amplifiers and generate two new output waves. The polarization of either of these new waves is logically related to the polarization of the input waves according to a truth table. Four-wave mixing has thus synthesized a single channel logical result from two distinct input channels. The desired gate operation (i.e., truth table) has been implemented at femtosecond speeds in the optical domain. It is important to note that the result of the separate mixing processes is one output wavelength.

Proceeding as outlined above, it is possible to implement any two-input truth table by this simple programming procedure.

Figures 1, 8A:
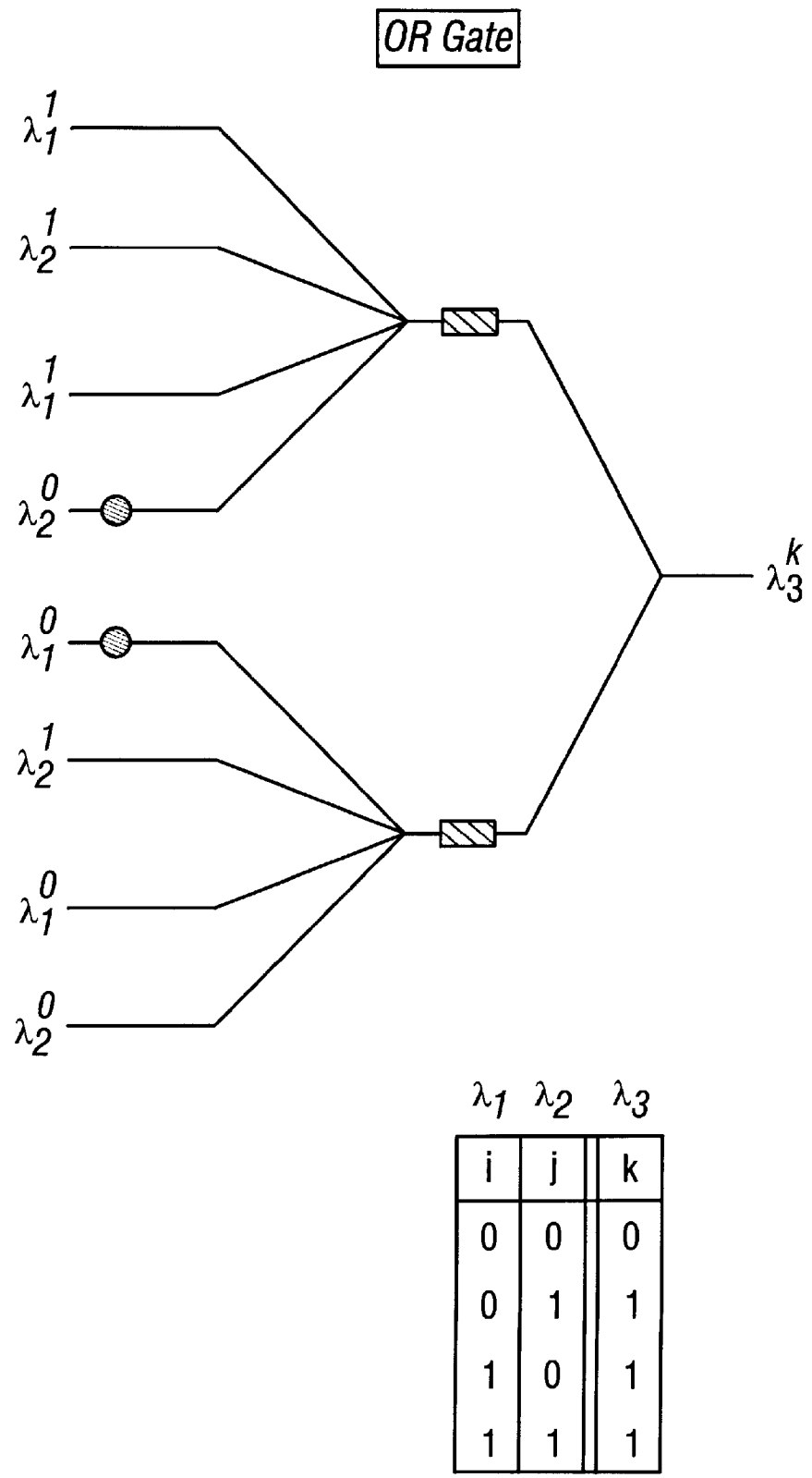
FIG. 8(A) shows a summary of truth table waveguide connections for common two-input logic gates.
Figures 2, 8A:
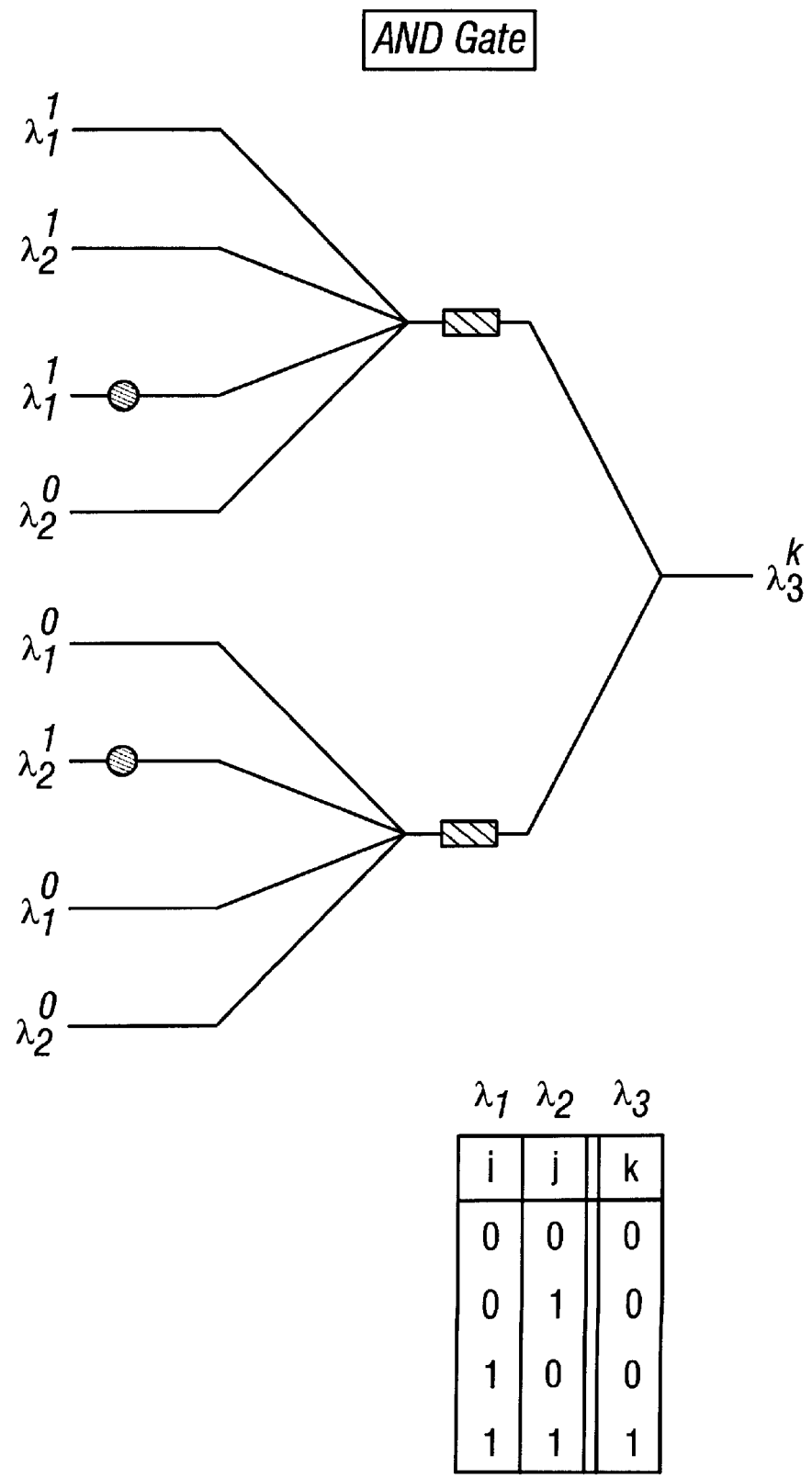
Figures 3, 8A:
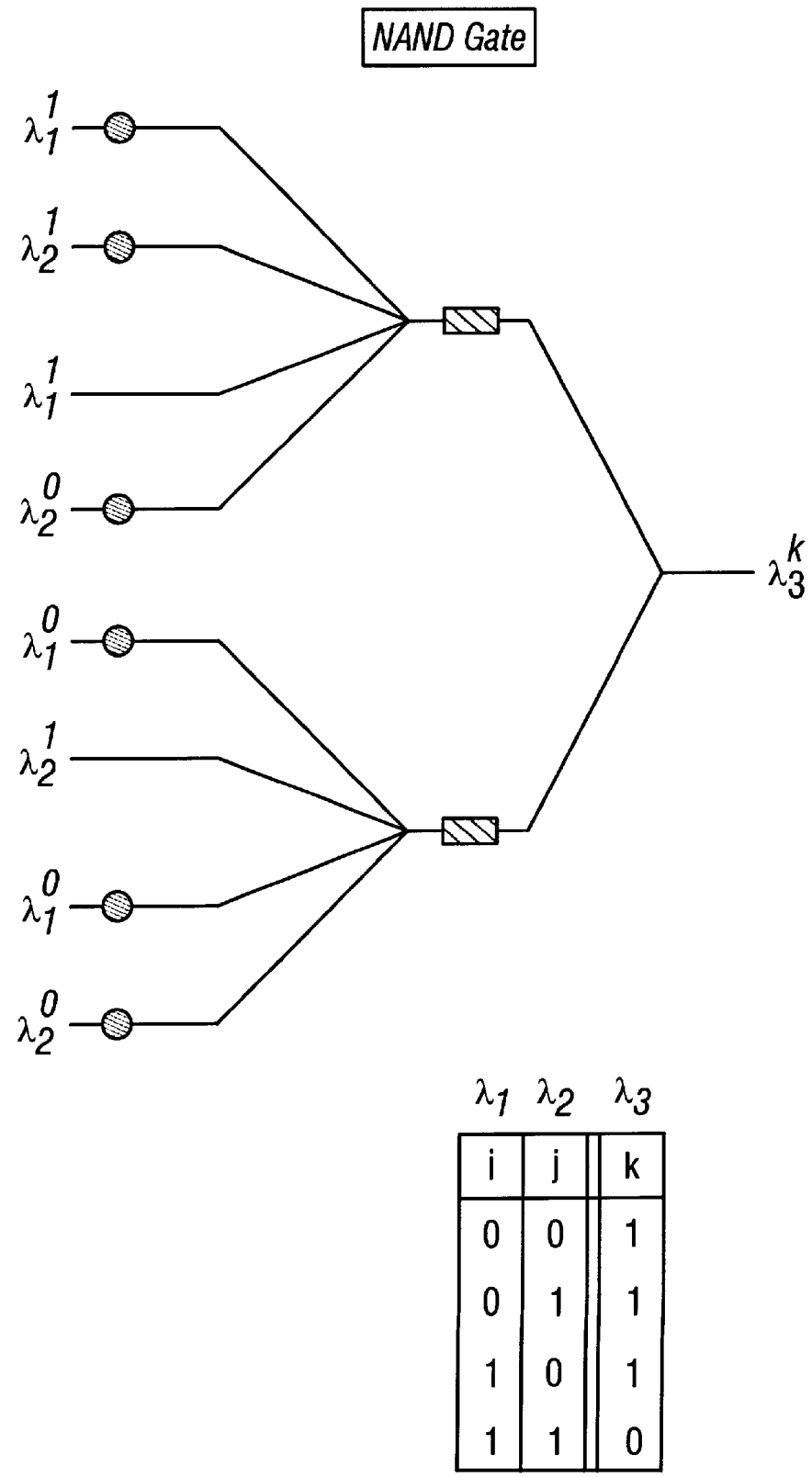
Figures 4, 8A:
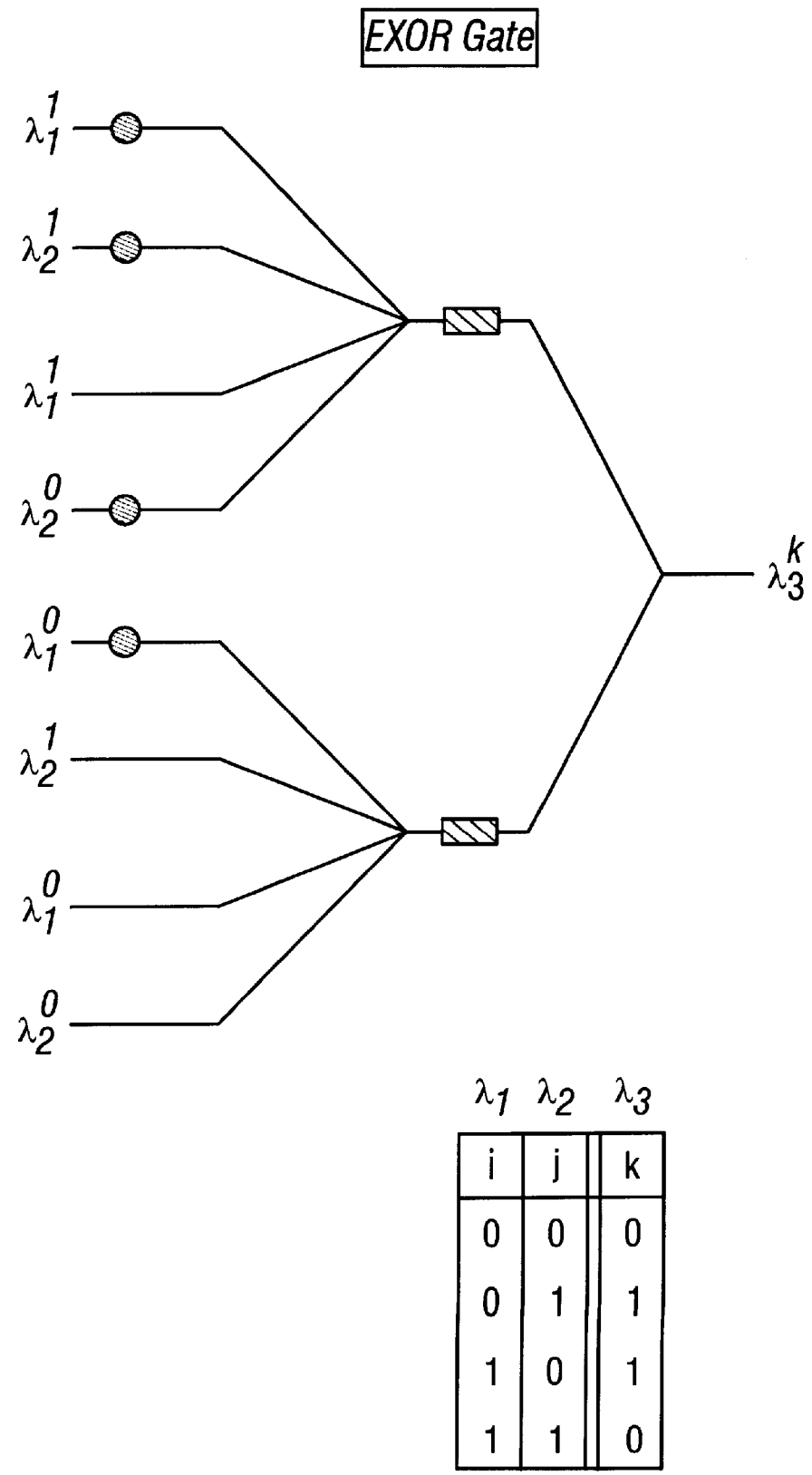

FIG. 8(A) shows the wave guide programs for four common logic gates (AND, OR, NAND and EXOR). More sophisticated multi-input or multi-output gate functions are possible using this same idea. However, it should be noted that multi-input functions can also be constructed using multiple two-input logic gates.

Figures 8B, 8E:
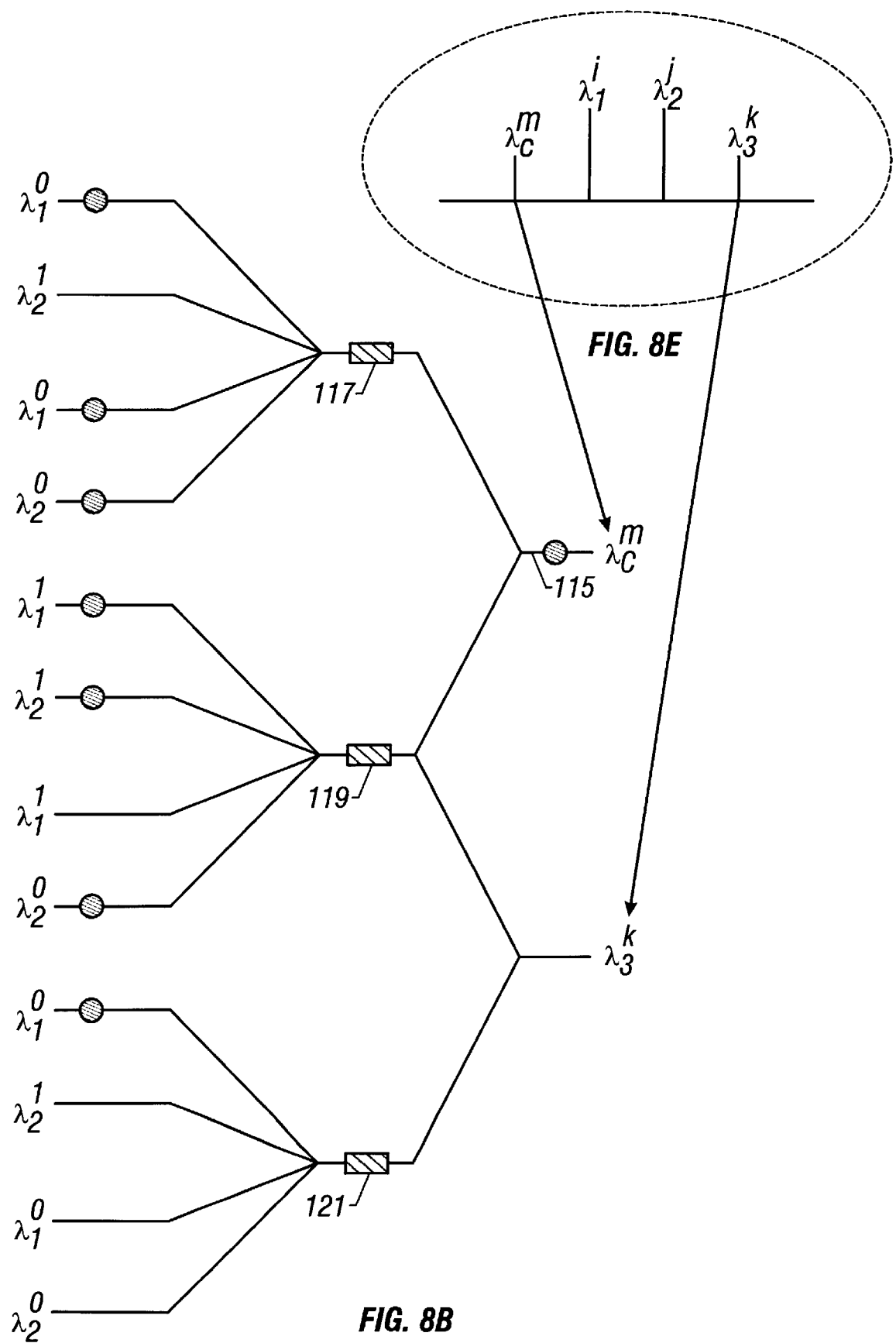
FIG. 8(B) shows a wave guide program for an EXOR gate with a carry output.
FIG. 8(E) shows the general polarization states of the input bits and the output bits.

For example, FIG. 8(B) shows a configuration for a two-bit binary Adder that includes an extra output port 115 that yields the carry bit for the addition process (essentially this is an EXOR gate with an extra output that gives the carry bit). In this case, only three optical amplifiers 117, 119, and 121 are required as opposed to the four amplifiers required to operate an AND gate and an EXOR gate as described above. This approach also makes use of the previously unused extra four-wave mixing side band that is generated in each semiconductor optical amplifier. The spectrum in FIG. 8(E) illustrates this point. In particular, the carry bit is assigned the spectral location of this extra wavelength. This means that a single output fiber can contain both the result of the addition as well as the carry bit on two separate wavelengths. The truth table for such an EXOR gate is shown in Table V.

Figures 8C, 8D:
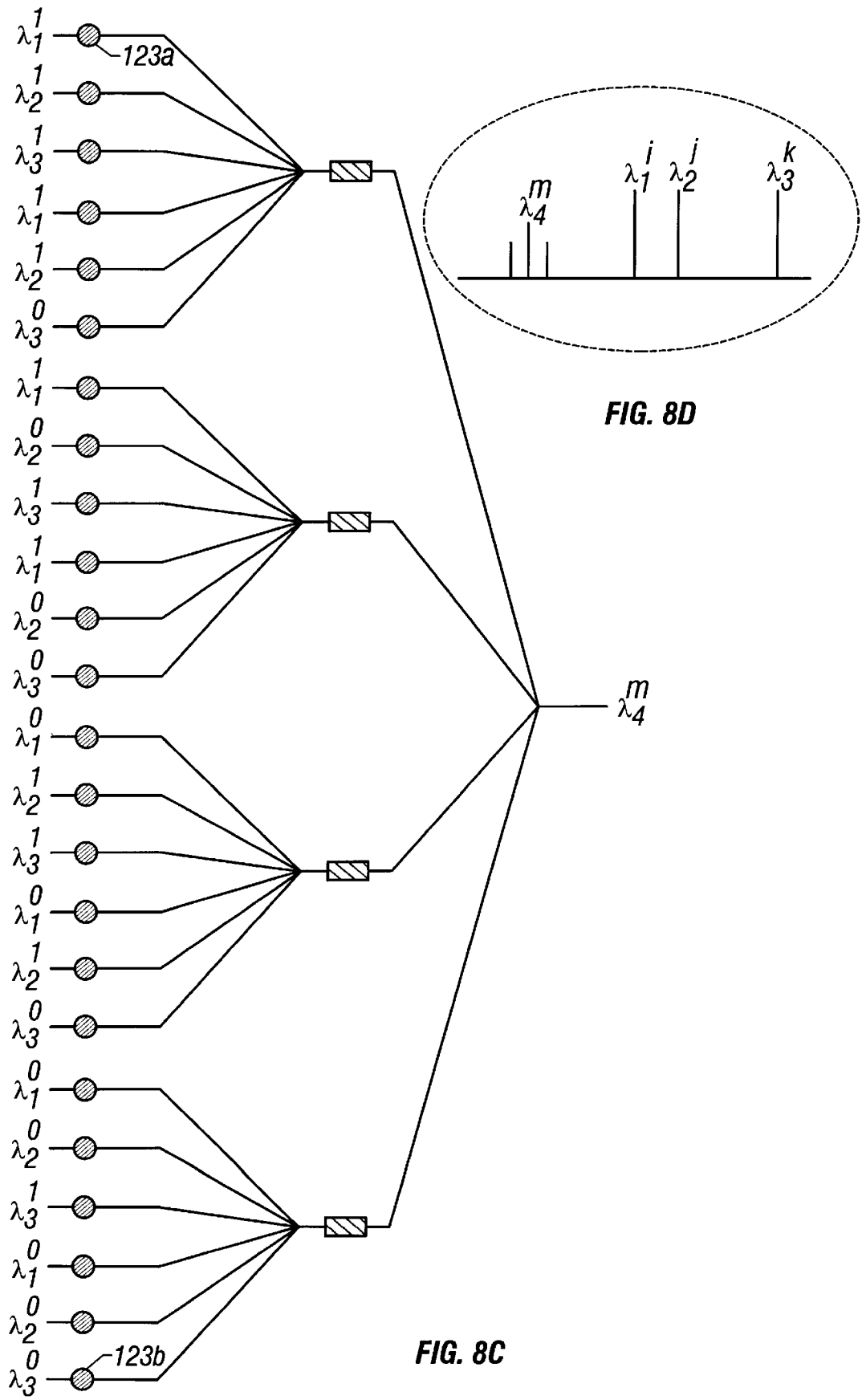
FIG. 8(C) shows a wave guide program for a generalized three input binary logic gate.
FIG. 8(D) shows the general polarization states of the input bits and the output bits.

FIG. 8(C) shows a generalized wave guide arrangement for an as yet un-programmed three input logic gate. The gate is again programmed using half-wave polarization elements 123a–123n. However, there is a significant variation in how the conditions are tested in the SOA. The three wavelengths corresponding to the three possible input bits are all involved simultaneously in the mixing process as shown in the spectrum of FIG. 8(D). In this way, it is possible to test for input conditions that involve all of the various permutations of the input states. The truth table for this three input logic gate is shown in Table VI.

The above description relies only upon the ability to mix two optical waves together in a nonlinear medium, i.e., wave mixing in semiconductor optical amplifiers is not required. In fact, the medium may include other nonlinear media having the same mixing polarization sensitivity as SOAs.

Silicon dioxide planar wave guide technology may be used to construct these devices and to monolithically integrate the same on a chip. Foundries may provide custom fabricated structures containing wavelength splitters, half-wave elements, N×M couplers and splitters, and polarizers. This substantially completes the list of elements needed to create most logic operations by the approach described above. Thus, a chip can be designed for each specific logic function or desired truth table. The design can then be used to create logic functions in quantity to enable construction of more complex logic functions.

Figure 8F:
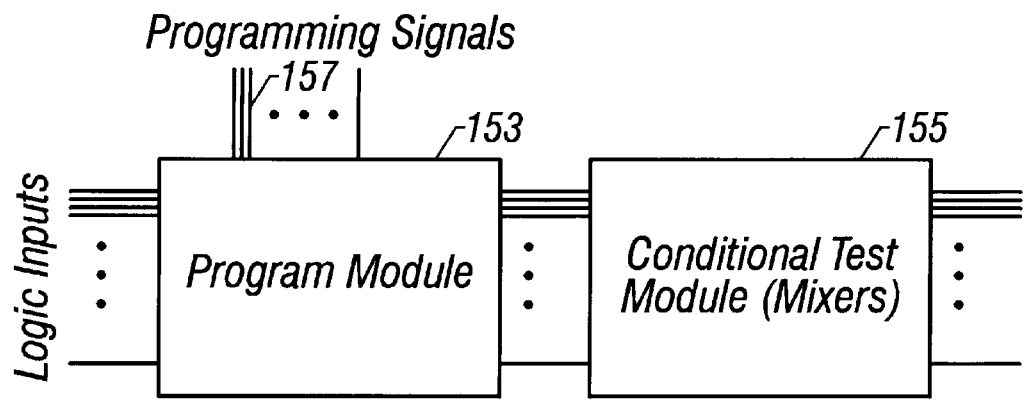
FIG. 8(F) shows separation of functions into those related to programming (polarization control) and those related to conditional testing (nonlinear mixing).

As shown in FIG. 8(F), the architecture of the logic gates permits a convenient separation-of the passive (linear) programmable elements from the conditional nonlinear test steps (nonlinear or four-wave mixing). The programmable elements may be monolithically integrated as a separate module 153 and then later attached to the conditional test elements 155. This may be desirable for increased ease in fabrication or to make use of different fabrication technologies for the programmable and the conditional test elements. For example, a dynamically programmable set of gates (or multi-input processor) could use electrical (or optical) control signals 157 to reconfigure their function by reprogramming the configuration of inverters. This may require the use of a thin film fabrication technology that is incompatible with the four-wave mixing element technology, thus requiring the kind of separation described above.

Figure 9A:
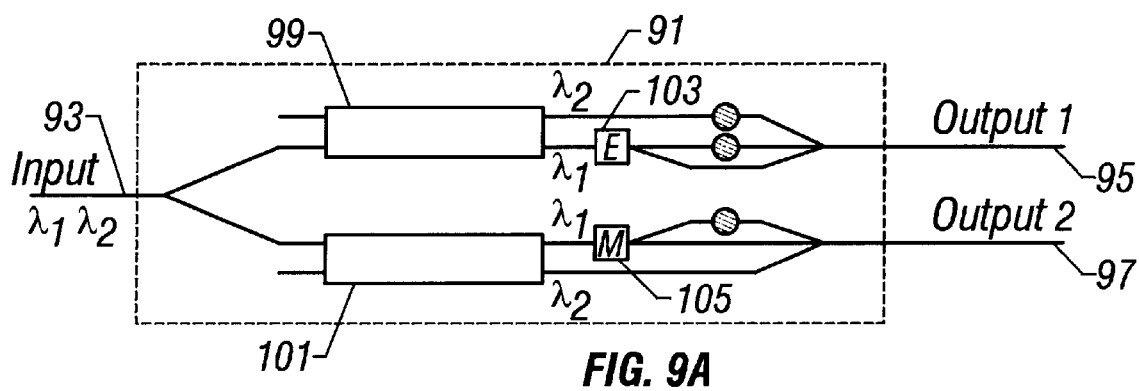
FIG. 9(A) shows an optical chip design for an EXOR wave guide chip.
Figure 9B:
FIG. 9(B) shows a legend for the elements of FIG. 9(A).

One design for an EXOR chip is shown in FIG. 9(A) (the chip is defined as the region contained in a box 91). FIG. 9(B) shows a legend for the associated optical elements. The EXOR gate has been selected since it is one of the basic building blocks of a digital Adder. Two bits on different wavelengths are introduced on a single optical fiber 93 at the left side of chip 91. The right side of chip 91 has two outputs 95 and 97 which are connected to two semiconductor optical amplifiers (not shown) that perform the conditional test functions necessary to complete the logic gate. The two essential gate design steps given in FIGS. 5 and 6(A) can be seen in the EXOR chip in FIG. 9. Input state resolution occurs using Mach-Zehnder interferometers 99 and 101 in conjunction with TE and TM polarizers 103 and 105, respectively. Truth table programming occurs in the right half of the chip as described above. Redundancies in the EXOR truth tables allow for simplifications beyond the most general programming array illustrated in FIG. 6(A).

Figure 10A:
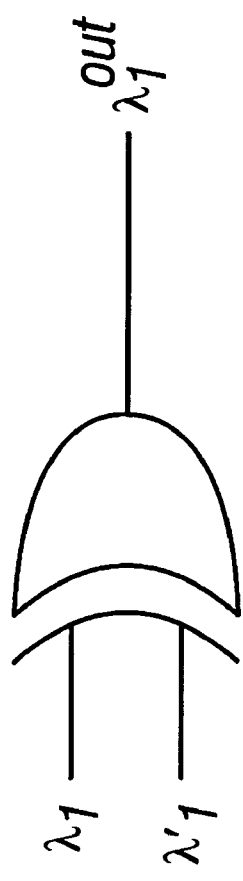
FIG. 10(A) shows an EXOR gate.
Figure 10B:
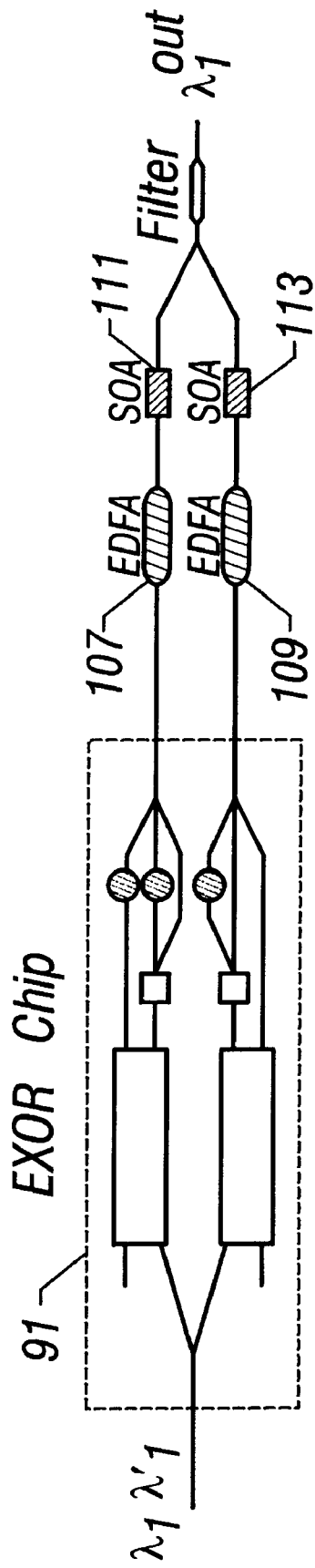
FIG. 10(B) shows a more detailed diagram of the components involved in making the EXOR gate of FIGS. 9 and 10(A).

FIG. 10(B) shows a detailed diagram of the components involved in making the EXOR gate. In addition to the EXOR waveguide chip 91, erbium doped fiber amplifiers (EDFAs) 107 and 109 and SOAs 111 and 113 may be used to complete the logic gate.

Figure 11A:
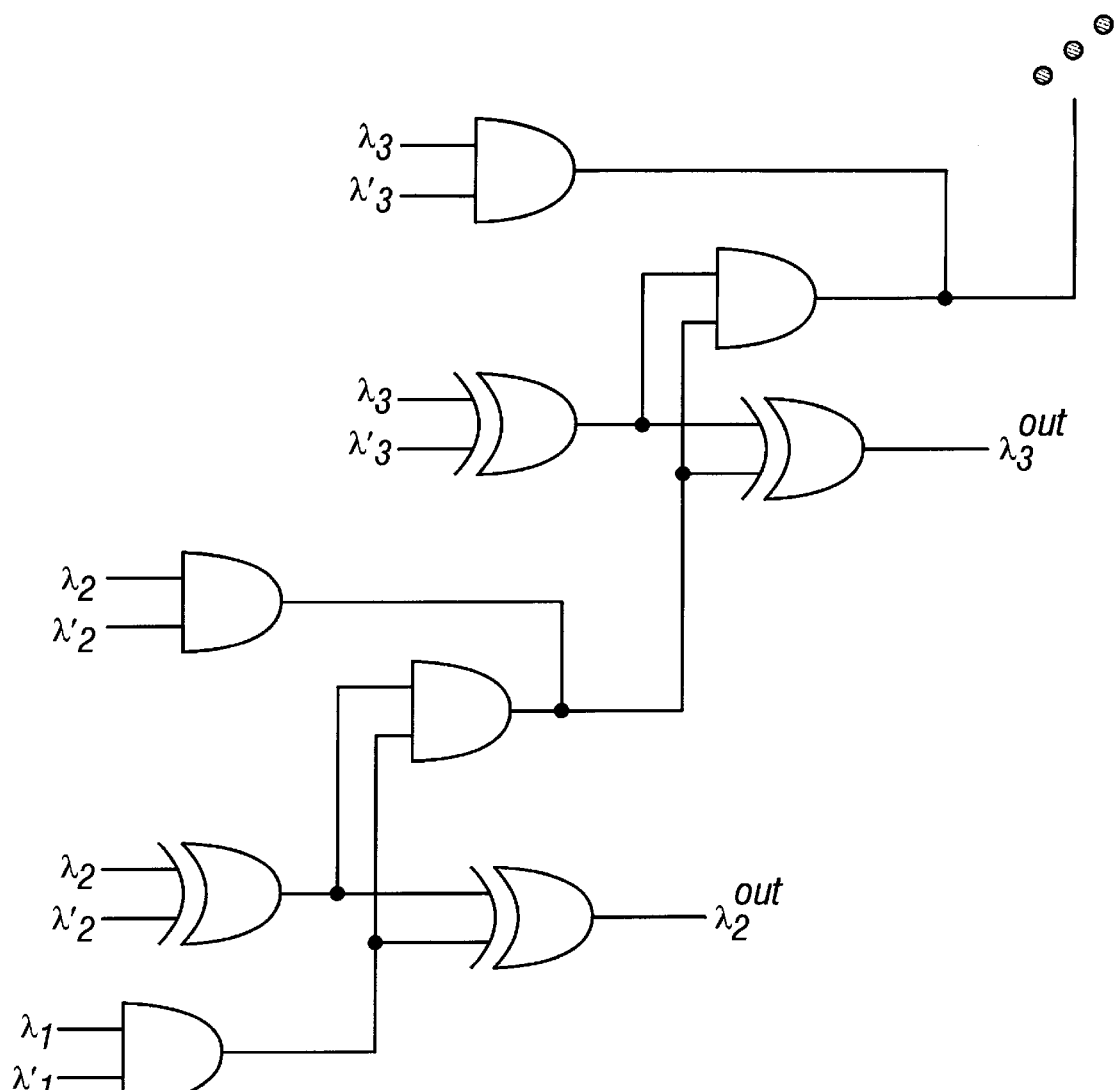
FIG. 11(A) shows a design of an Adder that processes wave-length encoded bytes and outputs a wavelength encoded byte.

The two-input logic gates described above form the basis for many possible digital circuits. For example, EXOR and AND gates can form the basis of an Adder circuit as shown in FIG. 11(A). This Adder circuit is implemented using multi-bit-length wavelength encoded words and outputs a wavelength encoded word in the spectral vicinity of the input bits. The two bottom gates provide for addition of the first bits and generation of the carry bit. The gates are shown with two inputs, but in reality have single fiber inputs which carry two distinct wavelengths (see FIG. 10).

Figure 11B:
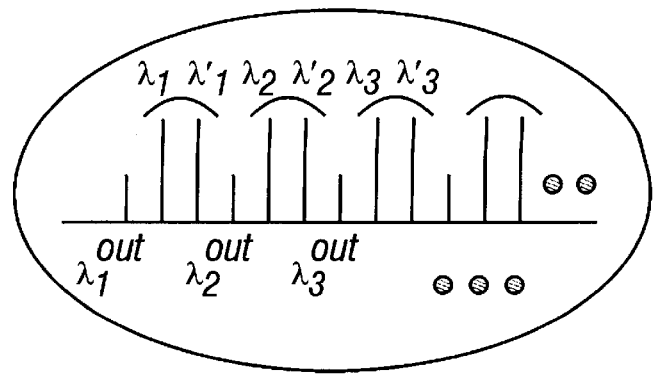
FIG. 11(B) shows the associated spectral input and output.

The design used here is extendable to include additional bits in the addition process or to create other digital functions. For example, the Adder circuit can add two 2-bit words (with carry bit generation) by adding another four gates to the design. Partial extension of the circuit to three-bit words is shown in FIG. 11(A). The spectral input and output wavelengths are shown in FIG. 11(B).

The logic gates described above either operate on two input bits, operate on multiple input bits, or have multi-bit outputs. However, a single logic gate can actually operate on two input bytes provided that the spectrum of the input bytes is organized properly. This kind of function is useful in situations where there is redundancy in gate usage across the bits making up the input bytes. For example, the Adder described above uses an EXOR and AND gate repeatedly and in the same fashion across the bits making up the input bytes.

EXAMPLE ONE

Figure 12:
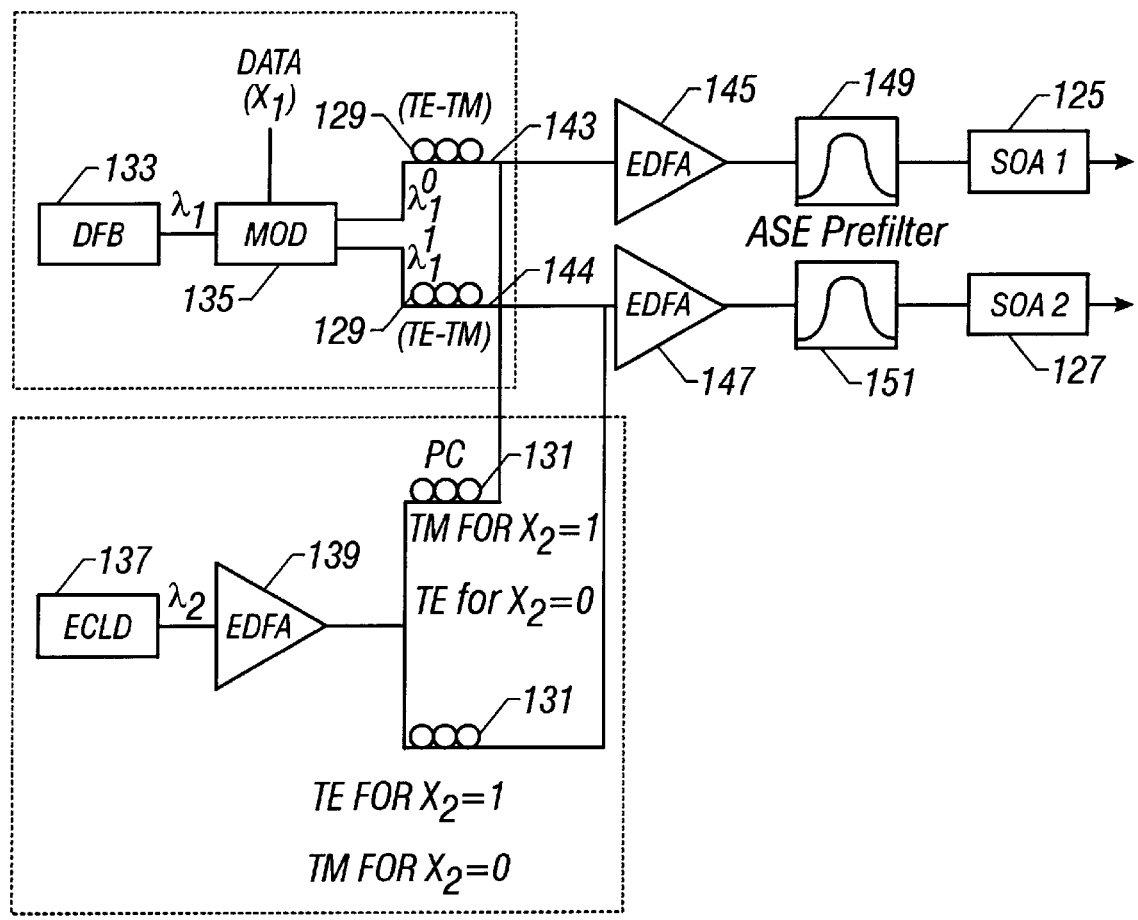
FIG. 12 shows a schematic diagram of an experimental setup used to implement an EXOR gate.

FIG. 12 shows a schematic diagram of the experimental setup used to implement an EXOR gate. In this experiment, polarization-maintaining waveguides were not used. Thus, the required polarization components could not be obtained at the input to each SOA 125 and 127 by simply inputting to the gate TM ($\lambda_1^1$ and $\lambda_2^1$) and TE ($\lambda_1^0$ and $\lambda_2^0$) waves followed by polarization rotators. Instead, polarization controllers 129 and 131 were used.

In this experiment, only one of the input signals was modulated with digital information, signal $X_1$ of wavelength $\lambda_1$. The signal was provided by a distributed feedback laser ("DFB") 133 and modulated by a dual-output Mach-Zender modulator ("MOD") 135. External cavity laser diode ("ECLD") 137 outputs its beam to erbium-doped fiber amplifier ("EDFA") 139. MOD 135 had two output ports which provided a modulating signal 141 and a complement signal 143. MOD 135 was driven by a Hewlett-Packard bit-error-rate ("BER") tester with a preset bit pattern (at 2.5 Gb/s). The other input signal, $X_2$ of wavelength $\lambda_2$, was constant and set first to a logical one and then to a logical zero. In the former case, the EXOR truth table requires that the output signal Y be the complement of $X_1$; in the latter case, that $Y=X_1$. Appropriate control of $X_2$ was provided by two polarization controllers ("PC") 131.

Both sets of signals were output as shown in FIG. 12 to EDFAs 145 and 147. Following amplification, the signals were sent to ASE prefilters 149 and 151 (which were 10 nm wide optical bandpass filters), and finally to SOAs 125 and 127.

Figure 13A:
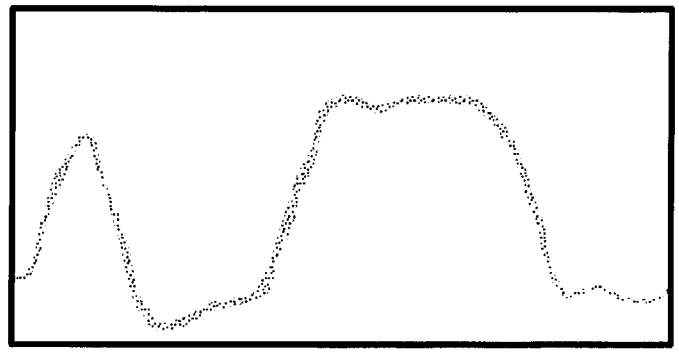
FIGS. 13(A)–(C) show experimental results for the setup of FIG. 13 for an EXOR gate.
Figure 13B:
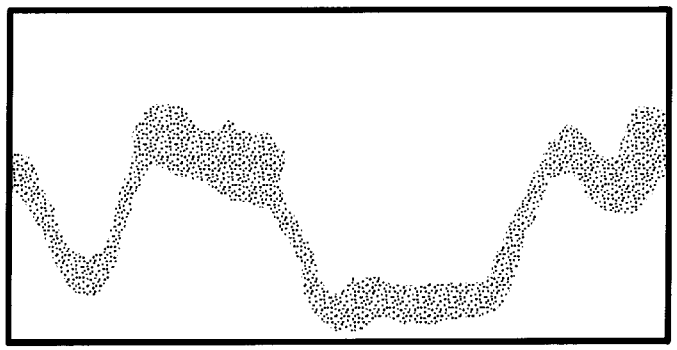
Figure 13C:
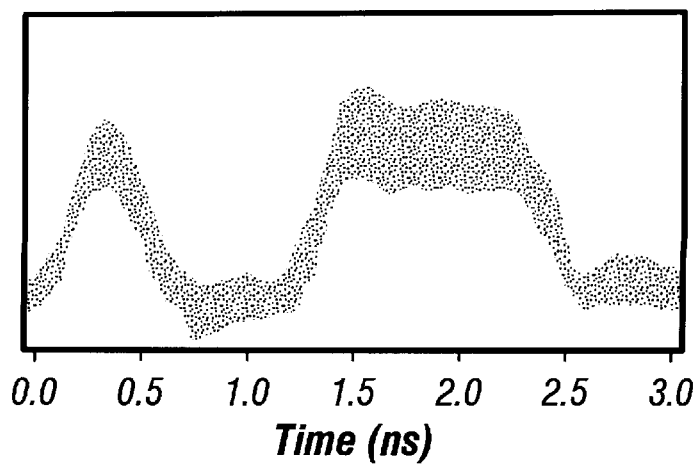

The results of the EXOR experiment are clearly shown in FIGS. 13(A)–(C). FIG. 13(A) represents the input bit pattern $X_1$. In particular, $X_1$ was the bit pattern (10011100) encoded on the optical intensity in wave $\lambda_1^1$. This pattern was measured with a Hewlett-Packard microwave transition analyzer. FIGS. 13(B) and 13(C) represent the output signal of the gate given that the other input $X_2$ is a logical one (FIG. 13(B)) or a logical zero (FIG. 13(C)). In the former case, consistent with the truth table, the output signal is seen to be the complement of $X_1$. Similarly, in FIG. 13(C), Y may be seen to be equal to $X_1$, again as required by the truth table.

SOAs 125 and 127 have a small-signal gain of only 10 dB, which results in a low four-wave mixing conversion efficiency. This low efficiency explains the additional noise in FIGS. 13(B) and 13(C).

EXAMPLE TWO

Using this hypothetical example, an ultra-fast all-optical error detection and correction circuit based on the above spectral logic gates is implemented. The circuit involves four logic gates that read a three-bit spectral bus and utilize a Hamming code to both detect and correct single errors. The circuit may be tested at rates such as 2.5 and 10 Gb/s using an NRZ pseudo-random data stream. Error rates may be measured while intentionally corrupting optical check bits and/or data. The selection of a Hamming code is only for illustration; one skilled in the art could implement more sophisticated codes on a much larger spectral bus which may be tested in a super-computer interconnection.

Spectral data bus transmission benefits from the ability to perform all-optical "front-end" operations on the bus. For example, all-optical coding, decoding, and error correction improves throughput and enables application of the ultrafast functions described above that may not be possible with electronics.

Referring to FIG. 14(A), such gates accept bits that are associated with certain predetermined bus wavelengths 163 and create new wavelengths 165 according to desired truth table rules. Referring to FIG. 14(B), such gates may be compared to prior art electronic gates 167 that accept bits associated with certain predetermined bus lines 169 which in turn drive lines 171 according to desired truth table rules.

Figure 15:
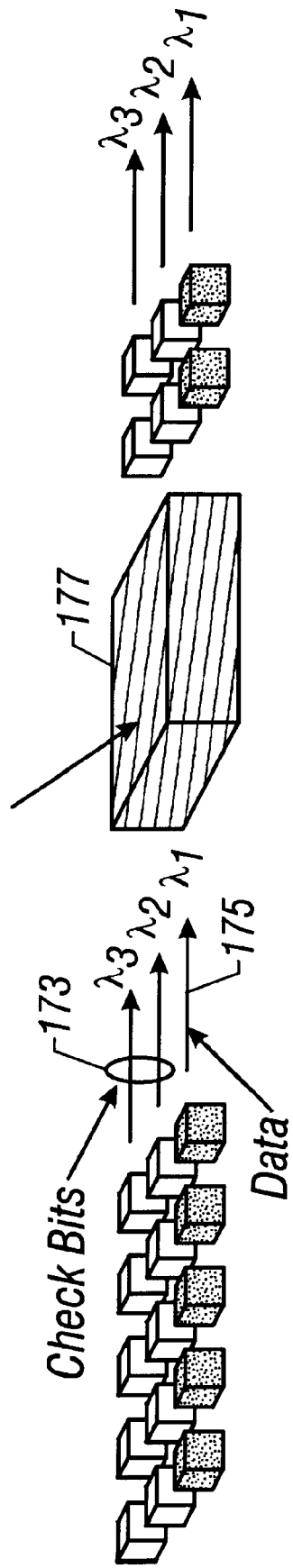
FIG. 15 shows a block diagram of an error detection and correction circuit according to an embodiment of the present invention.

FIG. 15 shows a block diagram of an error detection and correction circuit according to an embodiment of the present invention. This circuit uses spectrally-encoded check bits derived using a (3,1) Hamming code.

Note that a conventional transmission system would incorporate these check bits as a payload in a serial data packet. Error correction entails first de-serializing the data packet and then implementing the error detection/correction algorithm.

Spectral logic, as employed in the current invention, has the advantage of error detection and correction in parallel with the transmission (i.e., "on the fly" detection/correction). No de-serializer is necessary and the correction algorithm operates at the bus rate in the optical domain.

Check bits 173 are transmitted in parallel with data bits 175. Check bits 173 use other wavelengths available on the spectral bus. In FIG. 15, the (3,1) Hamming code is shown with a three-wavelength spectral bus containing two check bits and one data bit. The three-bit spectral data bus can experience single errors in any of the three bit locations and the circuit will locate and correct the errors. Here it is noted that the logic gates are completely general and that more powerful algorithms could be implemented on a much larger data bus. For example, a Hamming (15,11) code may be implemented using 4 check bits to perform error detection and correction on 11 data lines. Such a system is described in "WDM Coding for High-Capacity Light Wave Systems", by S. K. Shao and M. S. Kao, J. Lightwave Techno., 12, pp. 137–148 (1994), the entirety of which is incorporated herein by reference.

Circuit 177 involves combinations of gates operating in parallel as well as in cascade, and implements the Hamming error correction code. Hamming codes are "distance 3" codes and therefore permit the detection and correction of single errors (i.e., a single bit of the word having been reversed, as opposed to multiple bits). The rationale for such codes is based on the fact that multiple errors normally occur at a rate that is acceptably low. For example, a system in which single errors occur at a rate of $10^{-9}$ will have a double error rate of $10^{-18}$. The (3,1) code in this context combines simplicity with the ability to demonstrate error detection and correction on a single data line that has two check bits adjoined to it.

The (3,1) code space, i.e., the binary vectors that are used to send data, is spanned by the single vector (1,1,1) where each location in this vector corresponds to one of the three wavelengths employed in the experiment. The data stream is therefore particularly simple to realize and includes bit streams in which the polarization of all three transmitted wavelengths are rotated between TE and TM states in unison. This may be accomplished with a high-speed dual-output Mach-Zehnder modulator in which data and data-bar outputs are fed into a polarization sensitive bi-directional coupler as was used in the EXOR gate above.

Error detection is expressed mathematically by the so-called parity check matrix H, and for the (3,1) code takes the form:

$$H = \begin{pmatrix} 1 & 1 & 0 \\ 1 & 0 & 1 \end{pmatrix}$$

This matrix is used to test (by way of multiplication) the binary three component vectors defined by the three bit bus. When a given vector is a legitimate data word (in this case either (1,1,1) or (0,0,0)), the outcome of the multiplication is (0,0). However, if any of the bits in a legitimate data word have been corrupted by noise or other influences, then the outcome allows the determination of which bit has been flipped. For the above H matrix, the following outcomes are computed by carrying out the matrix multiplication:

No bits flipped=>(0,0)

Bit 1@$\lambda_1$ flipped=>(1,1)

Bit 2@$\lambda_2$ flipped=>(1,0)

Bit 3@$\lambda_3$ flipped=>(0,1)

If bit 1 is the data bit, then the outcome (1,1) indicates that the data bit has been corrupted and correction (i.e., flipping the bit back to normal) should be performed. To construct a logic circuit that will identify the presence of an error in this particular bit, the H matrix multiplication is simply converted to Boolean functions. Matrix multiplication here entails addition and multiplication as in normal matrix multiplication; however, multiplication is interpreted as the logical AND operation and addition is interpreted as the logical EXOR operation. The result is the circuit of FIG. 16, in which all gates shown are spectral gates and function completely in the optical domain. This circuit only shows one bus line; the two remaining lines would be constructed in a similar fashion.

Figure 16:
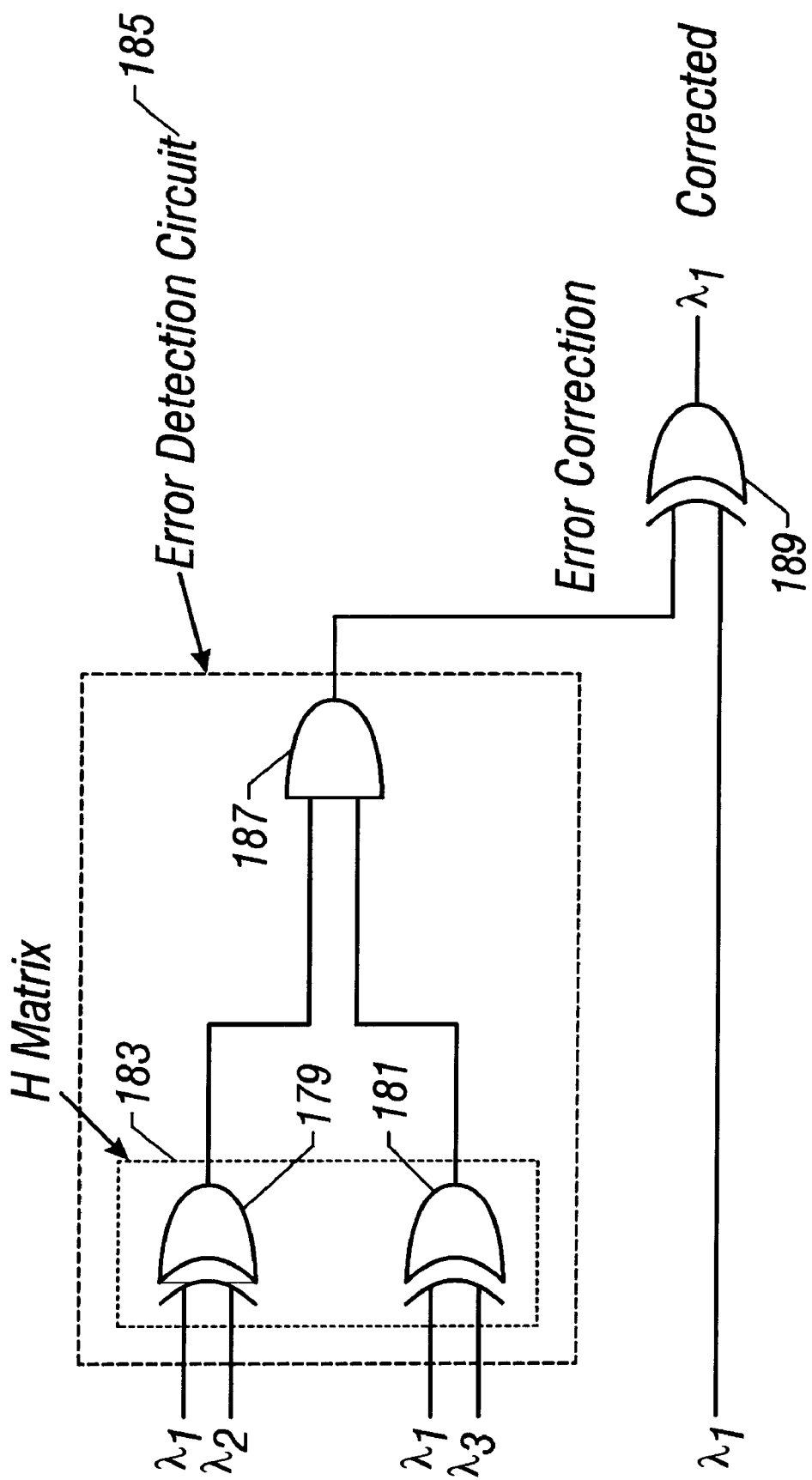
FIG. 16 shows a circuit for implementing the error detection and correction method of the present invention.

FIG. 16 shows an H matrix 183 as made up of two EXOR gates 179 and 181. The inputs of EXOR gate 179 are $\lambda_1$ and $\lambda_2$. The inputs of EXOR gate 181 are $\lambda_1$ and $\lambda_3$. The error detection circuit 185 includes the H matrix 183 and an AND gate 187. To identify a bit 1 error, EXOR gates 179 and 181 are AND'd together by AND gate 187. The outcome of this AND'ing function (1,1) produces a logical "1" outcome that, in turn, can be used to re-flip the bit 1 data by way of a third EXOR gate. In particular, error correction occurs when the output of AND gate 187 is EXOR'd by EXOR gate 189 with the bit to be corrected, in this case, bit 1 having wavelength $\lambda_1$. Each gate in FIG. 16 has a single fiber optic input line and a single fiber optic output line.

The detection of the output signal for the purpose of error rate measurement is accomplished by applying a polarizer and then detecting with a conventional high-speed pin detector.

The present invention has been described in terms of preferred embodiments. The invention, however, is not limited to the embodiments depicted and described. Rather, the scope of the invention is defined by the appended claims.

TABLE I

| $\lambda_1$ | $\lambda_2$ | $\lambda_3$ |
|---|---|---|
| x | x | x |
| 1 | x | x |
| x | 1 | x |
| 1 | 1 | 1 |

TABLE II

| Legend for Optical Circuit Diagrams |
|---|
| Wavelength Converter (Conditional Test) |
| Half wave element (inverter) |
| Unassigned Half wave element |
| Polarization sensitive 1 × 2 Splitter |
| Wavelength sensitive 1 × 2 Splitter |
| 1 × 2 Splitter or Combiner |

TABLE III

EXOR Truth Table

| $\lambda_1$ i | $\lambda_2$ j | $\lambda_3$ k |
|---|---|---|
| 0 | 0 | 0 |
| 0 | 1 | 1 |
| 1 | 0 | 1 |
| 1 | 1 | 0 |

TABLE IV

| $\lambda_1$ i | $\lambda_2$ j | $\lambda_3$ k |
|---|---|---|
| 0 | 0 | A |
| 0 | 1 | B |
| 1 | 0 | C |
| 1 | 1 | D |

TABLE V

| $\lambda_1$ i | $\lambda_2$ j | $\lambda_3$ k | $\lambda_c$ m |
|---|---|---|---|
| 0 | 0 | 0 | 0 |
| 0 | 1 | 1 | 0 |
| 1 | 0 | 1 | 0 |
| 1 | 1 | 0 | 1 |

TABLE VI

| $\lambda_1$ i | $\lambda_2$ j | $\lambda_3$ k | $\lambda_4$ m |
|---|---|---|---|
| 0 | 0 | 0 | A |
| 1 | 0 | 0 | B |
| 0 | 1 | 0 | C |
| 1 | 1 | 0 | D |
| 0 | 0 | 1 | E |
| 0 | 1 | 1 | F |
| 1 | 0 | 1 | G |
| 1 | 1 | 1 | H |

What is claimed is:

1. A method of processing data and creating an optical logic gate, comprising:

encoding a first input datum onto a data line with a first wave having a first wavelength, an information content of the first input datum denoted by a first optical characteristic;

encoding a second input datum onto the data line with a second wave having a second wavelength different than the first wavelength, an information content of the second input datum denoted by a second optical characteristic;

optically processing the first and second waves in a nonlinear medium through a nonlinear wave mixing process to produce a first wave-mixing output wave and a second wave-mixing output wave, said first and second wave-mixing output waves having wavelengths different from the first and second wavelengths; and measuring an optical characteristic of one of the first and second wave-mixing output waves to produce an optical indicator of a logic output of a logic operation on the first and second input data.

2. The method of claim 1, further comprising:

resolving the first and second waves into separate waveguides according to an optical state.

3. The method of claim 2, further comprising:

arranging a set of optical elements on certain of said waveguides to control polarization states of respective waves in said waveguides;

grouping waves in said waveguides into a plurality of pairs of two waves of two different wavelengths in two different waveguides to construct logic input combinations for according to wavelengths and polarizations a predetermined logic table; and selecting a pair to undergo the nonlinear wave mixing process in the nonlinear optical medium to produce an output for the logic table.

4. The method of claim 3, wherein said optical elements include half-wave plates.

5. The method of claim 3, wherein said predetermined table creates an AND Boolean logic gate for processing of the first and second waves.

6. The method of claim 3, wherein said predetermined table creates an OR Boolean logic gate for processing of the first and second waves.

7. The method of claim 3, wherein said predetermined table creates an EXOR Boolean logic gate for processing of the first and second waves.

8. The method of claim 3, wherein said predetermined table creates a NAND Boolean logic gate for processing of the first and second waves.

9. The method of claim 2, wherein the optical state is wavelength.

10. The method of claim 2, wherein the optical state is polarization.

11. The method of claim 2, wherein the optical state is polarization and wavelength.

12. The method of claim 10, further comprising: (X) pairing the resolved waves to form a plurality of possible binary combinations.

13. The method of claim 10, further comprising: (XI) dynamically altering the optical elements to change their functionality.

14. The method of claim 1, wherein the first and second optical characteristics are polarization states.

15. The method of claim 14, wherein the optical indicator includes a polarization of the one of the first and second wave-mixing output waves emitted from the nonlinear optical medium.

16. The method of claim 1, wherein the nonlinear optical medium includes a nonlinear semiconductor material.

17. The method of claim 1, further comprising:
receiving a first input wave at the first wavelength and a second input wave at the second wavelength;
producing two differently polarized input waves from the first input wave and two differently polarized input waves from the second input wave; and
selecting one polarized input wave at the first wavelength as the first wave and one polarized input wave at the second wavelength as the second wave.

18. The method of claim 1, wherein said processing is a nonlinear four wave mixing of the first and second input waves and the first and second wave-mixing output waves that are respectively at four different wavelengths.

19. A method of processing data and creating an optical logic gate, comprising:
receiving an optical wave comprising a plurality of input waves at different wavelengths;
using each input wave to produce two polarization waves in two orthogonal polarizations on two different data lines;
encoding a first input datum onto a first data line with a first polarization wave having a first wavelength;
encoding a second input datum onto a second data line with a second wave having a second wavelength;
directing the first and second data lines to overlap in a nonlinear medium to produce two different wave-mixing output waves at wavelengths different from the first and second wavelengths through a nonlinear wave mixing process;
selecting one of the two different wave-mixing output waves to represent a first logic output of a logic gate; and
using a third and fourth data lines of different wavelengths to produce a second output of the logic gate through the nonlinear wave mixing process.

20. An apparatus for optically processing data, comprising:
an input optical data line that carries input optical waves of different wavelengths;
a first beamsplitter which splits the input optical waves on the input data line into separate waves according to wavelength on which data is encoded;
at least two waveguides to direct the waves away from the beamsplitter;
a polarization element in each waveguide to split each separate wave into two polarization waves of different polarizations; and
a nonlinear optical medium to receive the polarization waves to effectuate a nonlinear four wave mixing process on two polarization waves of different wavelengths, the optical medium producing an output at a wavelength different from the different wavelengths to represent a logic result of an logic operation on the data represented by the two polarization waves.

21. The apparatus of claim 20, further comprising an optical modulator coupled to encode data onto each separate wave.

22. The apparatus of claim 21, further comprising a plurality of optical elements connected to certain of the data lines so split to control polarization states.

23. The apparatus of claim 22, wherein the optical elements are arranged so that the polarization waves form inputs for a predetermined logic table.

24. The apparatus of claim 23, wherein said predetermined table is an OR Boolean logic gate.

25. The apparatus of claim 23, wherein said predetermined table is an EXOR Boolean logic gate.

26. The apparatus of claim 23, wherein said predetermined table is a NAND Boolean logic gate.

27. The apparatus of claim 23, wherein said predetermined table is an AND Boolean logic gate.

28. The apparatus of claim 22, wherein the optical elements include half-wave plates.

29. The apparatus of claim 22, wherein the first beam splitter and optical elements are implemented in SiO2 chips.

30. The apparatus of claim 22, further comprising a controller to dynamically reconfigure the optical elements so as to change their functionality.

31. The apparatus of claim 21, wherein the optical modulator includes a Mach-Zehnder modulator.

32. The apparatus of claim 20, wherein the nonlinear optical medium includes a semiconductor material.

33. The apparatus of claim 20, further comprising a detector optically coupled to the output of the nonlinear medium which detects an optical characteristic of said waves.

34. The apparatus of claim 33, wherein the detector is polarization-sensitive.

35. An optical device, comprising:
an input module having at least one input waveguide to receive optical input signals of different input wavelengths, a plurality of polarization elements to produce two orthogonal polarization input signals from each input signal, and a plurality of output waveguides configured to output a combination of polarization input signals that constitute logic inputs to a logic table of a logic gate whose logic values are assigned based on wavelength and polarization; and a processing module to receive optical signals from the output waveguides of the input module and having a plurality of nonlinear optical units, each nonlinear optical unit coupled to receive at least two polarization input signals at different input wavelengths and including a nonlinear optical medium to effectuate a four wave mixing process to produce two wave-mixing output signals of output wavelengths different from the two input wavelengths, wherein each wave-mixing output signal from each nonlinear optical unit represents a logical output of the logic gate in response to the respective polarization input signals.

36. The device as in claim 35, further comprising a first semiconductor substrate on which the input module is formed, and a second semiconductor substrate on which the processing module is formed.

37. The device as in claim 35, wherein the input module includes at least one optical modulator to encode data on the input polarization waves.

38. The device as in claim 37, wherein the optical modulator includes a Mach-Zehnder modulator.

39. The device as in claim 35, wherein the polarization elements include a polarizer.

40. The device as in claim 35, wherein the polarization elements include a polarization rotator.

41. The device as in claim 35, wherein the polarization elements include a half-wave plate.

42. The device as in claim 35, wherein the polarization elements are configured to change the input polarization states of the combination of polarization input signals in response to control signals so as to form logic inputs for a logic table of a different logic gate.

43. The device as in claim 35, wherein the input optical module receives a first input signal at a first wavelength and a second optical signal at a second wavelength, and the output waveguides include:

a first output waveguide to receive a first polarization input signal in a first polarization at the first wavelength;

a second output waveguide to receive a second polarization input signal in the first polarization at the second wavelength;

a third output waveguide to receive a third polarization input signal in the first polarization at the first wavelength;

a fourth output waveguide to receive a fourth polarization input signal at the second wavelength in a second polarization that is perpendicular to the first polarization;

a fifth output waveguide to receive a fifth polarization input signal in the second polarization at the first wavelength;

a sixth output waveguide to receive a sixth polarization input signal in the first polarization at the second wavelength;

a seventh output waveguide to receive a seventh polarization input signal in the second polarization at the first wavelength; and an eighth output waveguide to receive an eighth polarization input signal in the second polarization at the second wavelength.

44. The device as in claim 43, wherein the processing module includes a first nonlinear optical unit coupled to receive inputs from the first, second, third, and fourth output waveguides in the input module, and a second nonlinear optical unit coupled to receive inputs from the fifth, sixth, seventh, and eighth output waveguides in the input module.

45. The device as in claim 43, wherein each of the first, second, fourth, and sixth output waveguides includes a polarization rotator to rotate a polarization by 90 degrees to form an exclusive OR gate.

46. The device as in claim 43, wherein each of the first, second, fourth, fifth, seventh, and eighth output waveguides includes a polarization rotator to rotate a polarization by 90 degrees to form an NAND gate.

47. The device as in claim 43, wherein each of the third and sixth output waveguides includes a polarization rotator to rotate a polarization by 90 degrees to form an AND gate.

48. The device as in claim 43, wherein each of the fourth and fifth output waveguides includes a polarization rotator to rotate a polarization by 90 degrees to form an OR gate.

49. The device as in claim 35, further comprising an optical amplifier coupled to each nonlinear optical medium to amplify each input polarization signal before it enters the nonlinear optical medium.

* * * * *

UNITED STATES PATENT AND TRADEMARK OFFICE
CERTIFICATE OF CORRECTION

PATENT NO. : 6,151,428
DATED : NOVEMBER 21, 2000
INVENTOR(S) : KERRY J. VAHALA

It is certified that error appears in the above-identified patent and that said Letters Patent is hereby corrected as shown below:

On page 1 of the specification, before line 1, insert

--The U.S. Government has certain rights to this invention pursuant to grant number F49620-95-1-0178 awarded by the U.S. Navy.--

Signed and Sealed this

First Day of May, 2001

Attest:

NICHOLAS P. GODICI

Attesting Officer      Acting Director of the United States Patent and Trademark Office